United States Patent [19]

Chen et al.

[11] Patent Number: 5,687,090

[45] Date of Patent: Nov. 11, 1997

[54] POLYMER COMPONENT CHARACTERIZATION METHOD AND PROCESS SIMULATION APPARATUS

[75] Inventors: Chau-Chyun Chen, Lexington, Mass.; Michael Barrera, Oakdale, Minn.; Glen Ko, Tokyo, Japan; Martine Osias, Watertown, Mass.; Sundaram Ramamathan, Lexington, Mass.; David Tremblay, Cambridge, Mass.

[73] Assignee: Aspen Technology, Inc., Cambridge, Mass.

[21] Appl. No.: 671,082

[22] Filed: Jun. 27, 1996

Related U.S. Application Data

[63] Continuation of Ser. No. 299,919, Sep. 1, 1994, abandoned.

[51] Int. Cl.$^6$ ........................................... G06G 7/58
[52] U.S. Cl. ........................ 364/496; 364/500; 364/578
[58] Field of Search .............................. 364/468, 578, 364/496, 500, 149, 468.01, 150, 151

[56] References Cited

U.S. PATENT DOCUMENTS

| | | | |
|---|---|---|---|
| 5,025,388 | 6/1991 | Cramer, III et al. | 364/496 |
| 5,047,929 | 9/1991 | Fujita . | |
| 5,249,137 | 9/1993 | Wilson et al. | 364/496 |
| 5,260,882 | 11/1993 | Blanco et al. | 364/578 |
| 5,551,859 | 9/1996 | Cantrill et al. | 425/317 |

OTHER PUBLICATIONS

Ramanathan, S.M. et al., "Dynamic Flowsheet Simulation of Polymer Manufacturing Plants," Proceedings of 4th International Workshop on Reaction Engineering, *DECHEMA Monograph*, vol. 127:123–132 (Oct. 1992).

Appert, T. et al., "A General Framework for Modeling Polycondensation Processes," Proceedings of 4th International Workshop on Reaction Engineering, *DECHEMA Monograph*, vol. 127:189–197 (Oct. 1992).

Zacca, J.J. and Ray, W.H., "Modeling of the Liquid Phase Polymerization of Olefins in Loop Reactors," *Chem. Eng. Sci.*, vol. 48(22):3743–3765 (1993).

"Process Design for Polymer Production," by M. F. Malone and T. F. McKenna in *Proceedings of the Third International Conference on Foundations of Computer–Aided Process Design* (Snowmass, CO), pp. 469–483 (Jul. 1990).

McKenna, T. F., and Malone, M.F., "Systematic Design of Polymer Production Processes," Proceedings of the American Institute of Chemical Engineers 1988 Annual Meeting, pp. 1–29 (Nov. 1988).

McKenna, T. F., and Malone, M. F., "Polymer Process Design –I. Continous Production of Chain Growth Homopolymers," *Computers Chemical Engineering* vol. 14 (10) pp. 1127–1149 (1990).

Christiansen, R. L., and Ray W. H., "Polyred—a CAD Package for Polymerization Processes," *American Institute of Chemical Engineering 1990 Annual Meeting*.

(List continued on next page.)

*Primary Examiner*—Reba I. Elmore
*Assistant Examiner*—Brian C. Oakes
*Attorney, Agent, or Firm*—Hamilton, Brook, Smith & Reynolds, P.C.

[57] ABSTRACT

A flexible method for characterizing polymer components and the use of the same in general purpose polymer process simulation software has been developed. In this method and software apparatus, polymer molecules are defined in terms of their segments or structural units. In addition, a set of component attributes is associated with each polymer component. The component attributes are used to track information on polymer molecular structure, chemical composition and product properties, such as molecular weight averages, average copolymer composition, particle size distribution, etc. This methodology is used in a consistent manner by all key elements of simulation software, such as thermo-physical property calculations and polymerization kinetics.

13 Claims, 9 Drawing Sheets

OTHER PUBLICATIONS

Kalfas, G. A., and Ray, W. H., "Experimental Studies and Mathematical Modeling of Aqueous Suspension Polymerization Reactors (Styrene, Methyl Methacrylate)," *Dissertation Abstracts International* (DAI), vol. 54(04B): 2092 (1992).

Christiansen, R. L, and Ray, W. H., "Computer–Aided Design of Polymerization Reactors," Dissertation Abstracts International (DAI), vol. 51(03B):1385 (1990).

Arriola, D.J., and Ray, W. H., "Modeling of Addition Polymerization Systems," *Dissertation Abstracts International* (DAI), vol. 50(12B): 5762 (1989).

Christiansen, R. L., "Computer–Aided Design of Polymerization Reactors," Dissertation Abstracts International, vol. 51(3) (Sep. 1990).

Chen, Chuh–Yung et al., "Simulation for the Bulk Polymerization of Acrylonitrile," *Chung–kuo Kung Ch'eng Hsueh K'an/J. of the Chinese Institute of Engineers*, vol. 7(3) pp. 171–180 (Jul. 1984).

Armitage, P. D., "Modelling, Simulation, and Control of the Reaction Injection Moulding of Polymer Blends: Computer Modelling and Simulation of the Reaction Injection Moulding of Polyurethane—Acrylic Blends and the Development of a Computer–Controlled RIM Research Machine," *Dissertation Abstracts International*, vol. 52(7):348 (Jan. 1992).

Pollock, M. et al., "Dynamic Modelling of Molecular Weight and Particle Size Development for continuous Polyvinyl Acetate Emulsion Polymerization Reactors and Application to optimal Multiple Reactor System Design," *J. Org. Coatings Plast.* Chem, vol. 45 pp. 323–328 (Aug. 1981).

Macoveanu, M. et al., "Application of a Computer Temperature Program to Vinyl Chloride Batch Suspension Polymerization at Constant Rate," *J. Angew. Makromol. Chem.*, vol. 64 pp. 19–28 (Sep. 1977).

Ko, G. H. and Chen, Chau–Chyun, "Process Simulation in Polymer Manufacturing" *Computer & Chemical Engineering*, vol. 16, Supl. S481–S490 (1992).

Polymer technology Program License Agreement by and between Aspen Technology, Inc. and The Dow Chemical Company dated Nov. 13, 1992.

| Array Index | Description |
|---|---|
| 1, ..., N | Conventional component mole flows (kg-moles/sec) |
| N + 1 | Total mole flow (kg-moles/sec) |
| N + 2 | Temperature (K)NCC + 3Pressure (N/m2) |
| N + 4 | Mass enthalpy (J/kg) |
| N + 5 | Molar vapor fraction |
| N + 6 | Molar liquid fraction |
| N + 7 | Mass entropy (j/kg-K) |
| N + 8 | Mass density (kg/m3) |
| N + 9 | Molecular weight (kg/kg-mole) |
| N + 10 | Element 1 of attribute 1 |
| N + 11 | Element M of attribute 1 |
| N + 12 | Element 1 of attribute k |
| N + 13 | Element p of attribute k |

FIG. I

POLYMER COMPONENT CHARACTERIZATION METHOD AND PROCESS SIMULATION APPARATUS

RELATED APPLICATION

This application is a continuation of application Ser. No. 08/299,919 filed on Sep. 1, 1994, now abandoned, which is incorporated herein by reference in its entirety.

BACKGROUND OF THE INVENTION

In chemical process engineering, general purpose CAD (computer aided design) and process simulation software are used to evaluate new processes, design and retrofit plants, and de-bottleneck and optimize the operation of existing plants. Simulation packages such as ASPEN PLUS™, SPEEDUP™ (both of Aspen Technology, Inc., Cambridge, Mass.) and PRO/II™ (by Simulation Sciences of Brea, Calif. are now routinely used for these purposes in the chemical and petroleum industry. However, CAD and process simulation tools are less widely used in polymer manufacturing. This is due to the lack of a systematic and flexible methodology for characterizing polymer components in commercially available packages. Without such a methodology, it is not possible to develop a general purpose tool to address the modeling issues unique to polymer manufacturing processes (Ko, G. H., et al., "Process Simulation in Polymer Manufacturing," *Computers and Chemical Engineering*, Vol. 16, Suppl. S481-S490, (1992).

Modeling and simulation has been practiced by a few polymer manufacturing companies for at least a decade. However, the development and usage of models has been limited to a small number of specialists. Furthermore, the models developed have always been process specific and tended to be over-simplified. Application and maintenance of these models has always been very difficult. There is a strong need for general purpose process simulation software for polymer processes that combine the capabilities widely used in chemical process simulation with features and models necessary for modeling polymer manufacturing processes.

The lack of general purpose process simulation software for polymer processes can be attributed to the complexity of the phenomena involved, and the lack of sufficient theoretical knowledge in some areas such as phase equilibria for polymer systems and structure-property relationships. However, the lack of a consistent framework for polymer component characterization remains the central issue. The design and development of a general purpose polymer process simulation system is not possible without such a framework.

In fact, theoretical developments in the various polymer modeling areas, such as polymer characterization, physical properties, solution thermodynamics, and reaction engineering, have proceeded independently of each other, and have frequently used different basis for their formulation. For example, the population-balance/method-of-moments approach is used extensively in polymer reaction engineering. However, polymer physical property and thermodynamic models use a polymer mass, moles, segments or volume basis. General purpose simulation software for polymer processing must address this fundamental issue, and provide a common and consistent basis for representing the structure and composition of the polymer components, for use throughout the various modeling areas.

A polymer component is an ensemble of molecules whose properties are represented not as single values, but instead as property distributions. The properties of interest include the polymer molecular weight or chain length, copolymer composition, type and number of branches, type and number of end-groups, etc. These properties are needed for polymer thermo-physical property representation, polymerization kinetic calculations, and product property determination. The polymer structural characteristics may vary throughout the simulation, as new polymer molecules are produced, or when mixing or separation of the polymer flow streams occurs. Therefore, this information should be carried by the process simulation streams together with other relevant data such as component flowrates, temperature, and pressure. Equations representing the polymer structural characteristics must also be included in and solved by the unit operation models to account for the formation, mixing, blending and splitting of polymers.

SUMMARY OF THE INVENTION

The present invention addresses the foregoing concerns in simulating polymer processes. In particular, the present invention provides a unique and flexible methodology for characterizing polymer components in process simulation software. This methodology provides a systematic framework for describing the structural and chemical composition of polymer components, and addresses an essential factor for the development of a general purpose polymer process simulator. It also serves as a unifying agent for incorporating developments in the key polymer modeling areas into a consistent process simulation tool.

In the present invention method, polymer molecules are defined in terms of their segments or structural units. In addition, a set of component attributes is associated with each polymer component. For each polymer component in a flow stream, component attributes are used to track information on polymer molecular structure, chemical composition and product properties, such as molecular weight averages, average copolymer composition, and particle size distribution. This attribute information is used by all key elements of the simulation software, such as thermophysical property calculations, phase equilibria, and polymerization kinetic models. Furthermore, component attribute equations are solved along with mass and energy balance equations by the unit operation models.

In a preferred embodiment, digital processor apparatus for simulating polymer processes according to the present invention include input means, a data assembly and processor simulation means. The input means enable user definition of a desired polymer process, where the polymer process is formed of a multiplicity of streams and elements including at least one polymer component. The data assembly is coupled to the input means for holding data of the desired polymer process. For each polymer component, the data assembly represents the polymer component as a collection of segments and a set of attributes, where the collection of segments and set of attributes define the polymer component. The processor means simulates the desired polymer process by mathematically modelling stream flow and element operations of the desired polymer process. The mathematical modelling includes the calculation of polymer physical properties and attribute values of the polymer components using the data stored in the data assembly.

According to one aspect of the present invention, for each polymer component, the data assembly includes attributes for indicating one or more of the following: chain length, molecular weight average, polymer segment composition, end-group composition, type and degree of branching, and polymer molecular weight distribution moments.

According to another aspect of the present invention, for each polymer, the data assembly includes user defined attributes for further defining the polymer component.

In addition, there are different types of segments for defining a polymer component. To that end, for each polymer component, the data assembly provides an indication of the different type segments defining the polymer component.

According to another aspect of the present invention, the processing means further stores different stages of calculation results in the data assembly. As such, during mathematical modelling of each stream, the processor means uses the stored values of the collection of segments and set of attributes of each polymer component as held in the data assembly.

In addition, the processor means utilizes mixing and splitting rules to mathematically model mixing and/or splitting of streams.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 1 is a schematic diagram of the stream data structure employed by the present invention.

DETAILED DESCRIPTION OF THE INVENTION

Polymer Characterization and Polymer Component Attributes

Figure 2:
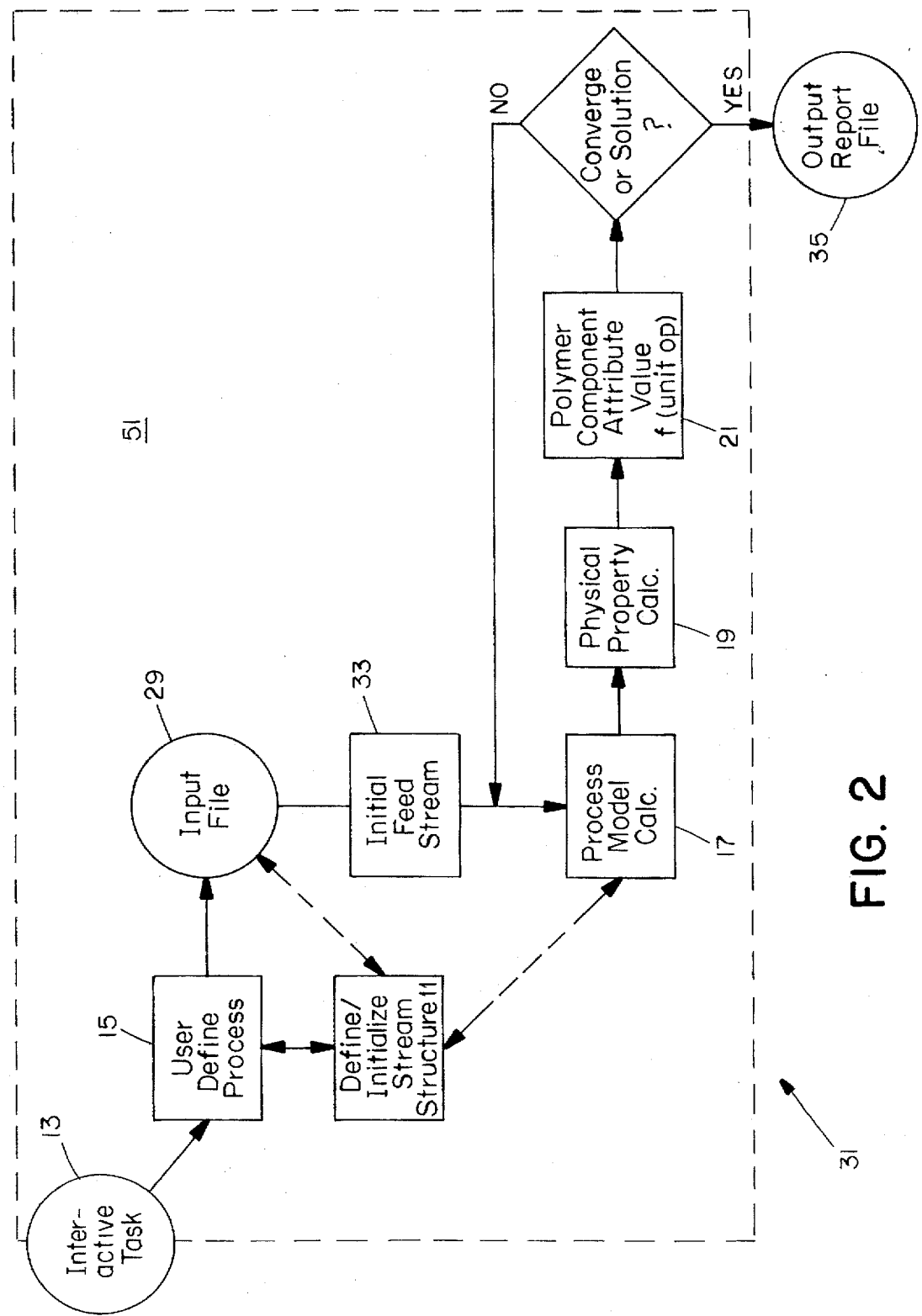
FIG. 2 is a block diagram of simulation software of the present invention.

Characterization of a polymer component poses unique challenges. Unlike conventional components, the polymer component is not a single species but a collection of many polymer species with property distributions. For example, the polymer molecular weight, segment composition and chain branching, vary from one polymer molecule to another.

During polymerization, polymer macromolecules are formed from monomeric species (monomers) and from small quantities of other reactants such as initiators, catalysts, etc. A polymer macromolecule can be viewed as being made up of a number of structural units called segments. The nature of the monomers and the conditions under which polymerization occurs define the types (or composition), number (or chain length), and arrangement (or sequence) of the structural units or segments in a polymer macromolecule.

The different types of segments may be the result of polymerization, chain branching or cross-linking reactions, and chain initiation or termination reactions. In the simplest case, an unbranched homopolymer can be viewed as having only one type of segment corresponding to the monomer (e.g. —$CH_2$—$CH_2$— in polyethylene). However, in general most polymers, including a homopolymer macromolecule, will contain a number of different types of segments.

Furthermore, the random nature of the polymerization reactions results in polymer molecules having a distribution of chain lengths, segment types and sequence lengths, branches, etc. Hence, the properties of polymer components must in general be characterized by distributions or average values representing statistical moments of the distributions.

The present invention method tracks the characteristics of polymers as polymer component attributes. This provides a convenient means of extending the stream data structure of a process simulator software package, to allow storage and retrieval of polymer characteristics. Four sets of polymer component attributes are used to represent the characteristics of the four types of polymer molecules that may be distinguished in the polymerization kinetic models. The four sets are composite, composite live, site based, and site based live polymer attributes.

The four attribute sets are further described below and in Tables 1–5. In particular, the four polymer component attribute sets are summarized in Table 1 and the attributes in each set are summarized in Tables 2 through 5. The choice of a set and of individual attributes within the chosen sets depends on the polymerization kinetic model, physical property model, and the approximation routine/procedure (e.g., quasi-steady state approximation) invoked for the simulation. This is summarized in Table 6.

Polymerization Kinetics and Polymer Component Attributes

Four sets of polymer component attributes are used to represent the characteristics of the four types of polymer molecules that may be encountered in polymerization kinetic models of a simulation software package. The four sets are composite, composite live, site based, and site based live polymer attributes. See Table 1.

A composite polymer is defined as the sum of all polymers produced at the different catalyst site types in the case of Ziegler-Natta polymerization. For polymerization kinetics, such as free radical and step growth, which do not use a heterogeneous catalyst with different active site types, this set is the main group of component attributes needed in polymer process simulations. However, not all of the attributes within this set are required for every simulation.

In the preferred embodiment, the required sub-set of attributes within the composite polymer attribute set includes the zeroth moment of the chain length distribution (ZMOM), the polymer segment flow rates (SFLOW), segment mole fractions (SFRAC), second moment of the chain length distribution (SMOM), number average degree of polymerization (DPN), and the number average molecular weight (MWN). See Table 2. Other attributes, such as the chain length distribution, polydispersity index (PDI), number of long and short chain branches (LCB and SCB), are optional in the preferred embodiment and may be used with specific polymerization kinetic models (see Table 6).

The composite live polymers attribute set is used to characterize the sum of "live" polymers being produced at the different catalyst site types. By definition, a live polymer consists of growing polymer chains that have an attached radical in the case of free radical polymerization, or are attached to a catalyst active site in the case of Ziegler-Natta polymerization. This set of attributes is used only for simulations in which the Quasi Steady-State Approximation (QSSA) is not invoked. If the QSSA is invoked, the attributes in this set are not used.

The set includes the zeroth, first and second live polymer chain length distribution moments (LZMOM, LFMOM, LSMOM), mole fraction of the bulk polymer that is a live polymer (LPFRAC), number and weight average degree of polymerization of the live polymer (LDPN and LDPW), and the live polymer repeat-unit and end-group segment flow rates and mole fractions (LSFLOW, LSFRAC, LEFLOW, LEFRAC). See Table 3.

The site based polymer attribute set contains attributes similar to the composite polymer attribute set described above. However, the attributes in this set include a catalyst site type dimension, and are used to track information for the polymer produced from each catalyst site type. See Table 4.

The site based live polymer attribute set contains attributes similar to the composite live polymer attribute set described above. However, the attributes in this set include a catalyst site type dimension, and are used to track information for the live polymer being produced at each catalyst site type. See Table 5.

TABLE 1

POLYMER COMPONENT ATTRIBUTE SETS

| Attribute Set | Description |
|---|---|
| Composite Polymer | The composite polymer attribute set includes polymer characterization attributes required by all Polymers Plus runs. |
| Composite Live Polymer | This attribute set includes attributes required to track the "live" polymer chains. This set does not pertain to step growth polymerizations. |
| Site Based Polymer | This set includes the attributes in the composite polymer set dimensioned to track information by site types. |
| Site Based Live Polymer | This set includes the attributes in the composite live polymer set dimensioned to track information by site type. |

TABLE 2

ATTRIBUTE DEFINITIONS — COMPOSITE POLYMER ATTRIBUTE SET

| Name | Symbol | Description | Equation (Class 0) | Class | Dimension | Units |
|---|---|---|---|---|---|---|
| DPN | $P_n$ | Number-average degree of polymerization | $P_n = \lambda_1/\lambda_0$ | 0 | 1 | Unitless |
| DPW | $P_w$ | Weight-average degree of polymerization | $P_w = \lambda_2/\lambda_1$ | 0 | 1 | Unitless |
| DPZ | $P_z$ | Z-average degree of polymerization | $P_z = \lambda_3/\lambda_2$ | 0 | 1 | Unitless |
| PDI | PDI | Polydispersity index | $PDI = P_w/P_n$ | 0 | 1 | Unitless |
| MWN | $M_n$ | Number-average molecular weight | $M_n = P_n M_{seg}$ | 0 | 1 | Unitless |
| MWW | $M_w$ | Weight-average molecular weight | $M_w = P_w M_{seg}$ | 0 | 1 | Unitless |
| MWZ | $M_z$ | Z-average molecular weight | $M_z = P_z M_{seg}$ | 0 | 1 | Unitless |
| MWSEG | $M_{seg}$ | Average segment molecular weight | $M_{seg} = \Sigma F_p(i) M_i$ | 0 | 1 | Unitless |
| ZMOM | $\lambda_0$ | Zeroth moment of chain length distribution | — | 2 | 1 | Mole flow |
| FMOM | $\lambda_1$ | First moment of chain length distribut | $\lambda_1 = \Sigma \lambda_1(i)$ | 0 | 1 | Mole flow |
| SMOM | $\lambda_2$ | Second moment of chain length distribution | — | 2 | 1 | Mole flow |
| TMOM | $\lambda_3$ | Third moment of chain length distribution | — | 2 | 1 | Mole flow |
| SFLOW | $\lambda_1(i)$ | Mole flow of segments of type i | — | 2 | NSEG | Mole flow |
| SFRAC | $F_p(i)$ | Mole fraction of segments of type i | $F_p(i) = \lambda_1(i)/\lambda_1$ | 0 | NSEG | Unitless |
| EFRAC | $F_e(i)$ | Fraction of chain end segments of type i | $F_e(i) = \lambda_1(i) / \sum_{ends} \lambda_1(i)$ | 0 | NEND | Unitless |
| LCB | LCB | Number of long chain branches | — | 2 | 1 | Mole flow |
| SCB | SCB | Number of short chain branches | — | 2 | 1 | Mole flow |
| FLCB | FLCB | Long chain branching frequency | $FLCB = \dfrac{10^3 \, LCB}{\lambda_1}$ | 0 | 1 | Unitless |
| FSCB | FSCB | Short chain branching frequency | $FSLB = \dfrac{10^3 \, SCB}{\lambda_1}$ | 0 | 1 | Unitless |

TABLE 3

ATTRIBUTE DEFINITIONS — COMPOSITE LIVE POLYMER ATTRIBUTE SET

| Name | Symbol | Definition | Equation (Class 0) | Class | Dimension | Units |
|---|---|---|---|---|---|---|
| LDPN | $P_n^*$ | Number average DP of live polymer | $P_n^* = \mu_1/\mu_0$ | 0 | 1 | Unitless |
| LDPW | $P_w^*$ | Weight average DP of live polymer | $P_w^* = \mu_2/\mu_1$ | 0 | 1 | Unitless |
| LPDI | PDI* | Polydispersity index of live polymer | $PDI^* = P_w^*/P_n^*$ | 0 | 1 | Unitless |
| LMWN | $M_n^*$ | Number average MW of live polymer | $M^* = P_n^* M_{seg}^*$ | 0 | 1 | Unitless |

TABLE 3-continued

ATTRIBUTE DEFINITIONS — COMPOSITE LIVE POLYMER ATTRIBUTE SET

| Name | Symbol | Definition | Equation (Class 0) | Class | Dimension | Units |
|---|---|---|---|---|---|---|
| LMWW | $M_w^*$ | Weight average MW of live polymer | $M_w^* = P_w^* M_{seg}^*$ | 0 | 1 | Unitless |
| LMWSEG | $M_{seg}^*$ | Average segment molecular weight of live polymer | $M_{seg}^* = \Sigma LF_p(i) M_i$ | 0 | 1 | Unitless |
| LZMOM | $\mu_0$ | Zeroth moment of live polymer | $\mu_0 = \Sigma \mu_0(i)$ | 0 | 1 | Mole flow |
| LFMOM | $\mu_1$ | First moment of live polymer | $\mu_1 = \Sigma \mu_1(i)$ | 0 | 1 | Mole flow |
| LSMOM | $\mu_2$ | Second moment of live polymer | — | 2 | 1 | Mole flow |
| LSFLOW | $\mu_1(i)$ | Segment flow rates in live polymer | — | 2 | NSEG | Mole flow |
| LSFRAC | $LF_p(i)$ | Segment mole fraction in live polymer | $LF_p(i) = \mu_1(i)/\mu_1$ | 0 | NSEG | Unitless |
| LEFLOW | $\mu_0(i)$ | End segment flow rates in live polymer | — | 2 | NSEG | Mole flow |
| LEFRAC | $LF_e(i)$ | End segment mole fractions in live polymer | $LF_e(i) = \mu_0(i)/\mu_0$ | 0 | NEND | Unitless |
| LPFRAC | $F_{lp}$ | Fraction of polymer that is live | $F_{lp} = \dfrac{\mu_0}{\lambda_0}$ | 0 | 1 | Mole fraction |

TABLE 4

ATTRIBUTE DEFINITIONS — SITE BASED POLYMER ATTRIBUTE SET

| Name | Symbol | Description | Equation (Class 0) | Class | Dimension | Units |
|---|---|---|---|---|---|---|
| SDPN | $P_n(j)$ | Number-average degree of polymerization at site j | $P_n(j) = \lambda_1(j)/\lambda_0(j)$ | 0 | NSITE | Unitless |
| SDPW | $P_w(j)$ | Weight-average degree of polymerization at site j | $P_w(j) = \lambda_2(j)/\lambda_1(j)$ | 0 | NSITE | Unitless |
| SDPZ | $P_z(j)$ | Z-average degree of polymerization at site j | $P_z(j) = \lambda_3(j)/\lambda_2(j)$ | 0 | NSITE | Unitless |
| SPDI | $PDI(j)$ | Polydispersity index at site j | $PDI(j) = P_w(j)/P_n(j)$ | 0 | NSITE | Unitless |
| SMWN | $M_n(j)$ | Number-average molecular weight at site j | $M_n(j) = P_n(j) M_{seg}(j)$ | 0 | NSITE | Unitless |
| SMWW | $M_w(j)$ | Weight-average molecular weight at site j | $M_w(j) = P_w(j) M_{seg}(j)$ | 0 | NSITE | Unitless |
| SMWZ | $M_z(j)$ | Z-average molecular weight at site j | $M_z(j) = P_z(j) M_{seg}(j)$ | 0 | NSITE | Unitless |
| SMWSEG | $M_{seg}(j)$ | Average segment molecular weight at site j | $M_{seg}(j) = \Sigma F_p(i,j) M_i$ | 0 | NSITE | Unitless |
| SZMOM | $\lambda_0(j)$ | Zeroth moment of chain length distribution at site j | — | 2 | NSITE | Mole flow |
| SFMOM | $\lambda_1(j)$ | First moment of chain length distribution at site j | $\lambda_1(j) = \Sigma \lambda_1(i,j)$ | 0 | NSITE | Mole flow |
| SSMOM | $\lambda_2(j)$ | Second moment of chain length distribution at site j | — | 2 | NSITE | Mole flow |
| STMOM | $\lambda_3(j)$ | Third moment of chain length distribution at site j | — | 2 | NSITE | Mole flow |
| SSFLOW | $\lambda_1(i,j)$ | Mole flow of segments of type i at site j | — | 2 | NSEG, NSITE | Mole flow |
| SSFRAC | $F_p(i,j)$ | Mole fraction of segments of type i at site j | $F_p(i,j) = \lambda_1(i,j)/\lambda_1(j)$ | 0 | NSEG, NSITE | Unitless |
| SEFRAC | $F_e(i,j)$ | Fraction of chain end segments of type i at site j | $F_e(i,j) = \lambda_1(i,j)/\sum_{ends} \lambda_1(i,j)$ | 0 | NEND, NSITE | Unitless |
| SLCB | $LCB(j)$ | Number of long chain branches at site j | — | 2 | NSITE | Mole flow |
| SSCB | $SCB(j)$ | Number of short chain branches at site j | — | 2 | NSITE | Mole flow |
| SFLCB | $FLCB(j)$ | Long chain branching frequency at site j | $FLCB(j) = \dfrac{10^3 \, LCB(j)}{\lambda_1(j)}$ | 0 | NSITE | Unitless |
| SFSCB | $FSCB(j)$ | Short chain branching frequency at site j | $FSLB(j) = \dfrac{10^3 \, SCB(j)}{\lambda_1(j)}$ | 0 | NSITE | Unitless |

TABLE 5

ATTRIBUTE DEFINITIONS — SITE BASED LIVE POLYMER

| Name | Symbol | Definition | Equation (Class 0) | Class | Dimension | Units |
|---|---|---|---|---|---|---|
| LSDPN | $P_n^*(j)$ | Number average DP of live polymer | $P_n^*(j) = \mu_1(j)/\mu_0(j)$ | 0 | NSITE | Unitless |
| LSDPW | $P_w^*(j)$ | Weight average DP of live polymer | $P_w^*(j) = \mu_2(j)/\mu_1(j)$ | 0 | NSITE | Unitless |
| LSPDI | $PDI^*(j)$ | Polydispersity index of live polymer | $PDI^*(j) = P_w^*(j)/P_n^*(j)$ | 0 | NSITE | Unitless |
| LSMWN | $M_n^*(j)$ | Number average MW of live polymer | $M_n^*(j) = P_n^*(j) M_{seg}^*(j)$ | 0 | NSITE | Unitless |
| LSMWW | $M_w^*(j)$ | Weight average MW of live polymer | $M_w^*(j) = P_w^*(j) M_{seg}^*(j)$ | 0 | NSITE | Unitless |
| LSMWSEG | $M_{seg}^*(j)$ | Average segment molecular weight of live polymer | $M_{seg}^*(j) = \Sigma LF_p(i,j) M_i$ | 0 | NSITE | Unitless |
| LSZMOM | $\mu_0(j)$ | Zeroth moment of live polymer | $\mu_0(j) = \Sigma \mu_0(i,j)$ | 0 | NSITE | Mole flow |
| LSFMOM | $\mu_1(j)$ | First moment of live polymer | $\mu_1(j) = \Sigma \mu_1(i,j)$ | 0 | NSITE | Mole flow |
| LSSMOM | $\mu_2(j)$ | Second moment of live polymer | — | 2 | NSITE | Mole flow |
| LSSFLOW | $\mu_1(i)$ | Segment flow rates in live polymer | — | 2 | NSEG, NSITE | Mole flow |
| LSSFRAC | $LF_p(i)$ | Segment mole fraction in live polymer | $LF_p(i,j) = \mu_1(i,j)/\mu_1(j)$ | 0 | NSEG, NSITE | Unitless |
| LSEFLOW | $\mu_0(i)$ | End segment flow rates in live polymer | — | 2 | NSEG, NSITE | Mole flow |
| LSEFRAC | $LF_e(i)$ | End segment mole fractions in live polymer | $LF_e(i,j) = \mu_0(i,j)/\mu_0(j)$ | 0 | NEND, NSITE | Unitless |
| LSPFRAC | $F_{lp}(j)$ | Fraction of polymer that is live | $F_{lp}(j) = \dfrac{\mu_0(j)}{\lambda_0(j)}$ | 0 | NSITE | Mole fraction |

TABLE 6

SUMMARY OF POLYMER COMPONENT ATTRIBUTE USAGE IN POLYMERS PLUS

| Composite Polymer Attribute | Properties | Step-Growth RXN | Free-Radical RXN | Ziegler-Natta RXN | Composite Live Polymer Attribute | Properties | Step-Growth RXN | Free-Radical RXN | Ziegler-Natta RXN |
|---|---|---|---|---|---|---|---|---|---|
| DPN | R | R | O | O | LDPN | N | N | O | O |
| DPW | N | N | O | O | LDPW | N | N | O | O |
| DPZ | N | N | O | O | LPDI | N | N | O | O |
| PDI | N | N | O | O | LMWN | N | N | O | O |
| MWN | O | O | O | O | LMWW | N | N | O | O |
| MWW | N | O | O | O | LMWSEG | N | N | O | O |
| MWZ | N | O | O | O | LZMOM | N | N | O | O |
| MWSEG | O | O | O | O | LFMOM | N | N | O | O |
| ZMOM | R | R | R | R | LSMOM | N | N | O | O |
| FMOM | R | R | R | R | LSFLOW | N | N | O | O |
| SMOM | N | N | O | O | LSFRAC | N | N | O | O |
| TMOM | N | N | O | O | LEFLOW | N | N | O | O |
| SFLOW | R | R | R | R | LEFRAC | N | N | O | O |
| SFRAC | R | R | R | R | | | | | |
| EFRAC | N | N | O | O | | | | | |
| LCB | N | N | O | O | | | | | |
| SCB | N | N | O | O | | | | | |
| FLCB | N | N | O | O | | | | | |
| FSCB | N | N | O | O | | | | | |

| Site Based Polymer Attribute | Properties | Step-Growth RXN | Free-Radical RXN | Ziegler-Natta RXN | Site Based Live Polymer Attribute | Properties | Step-Growth RXN | Free-Radical RXN | Ziegler-Natta RXN |
|---|---|---|---|---|---|---|---|---|---|
| SDPN | N | N | N | O | SLDPN | N | N | N | O |
| SDPW | N | N | N | O | SLDPW | N | N | N | O |
| SDPZ | N | N | N | O | SLPDI | N | N | N | O |
| SPDI | N | N | N | O | SLMWN | N | N | N | O |
| SMWN | N | N | N | O | SLMWW | N | N | N | O |
| SMWW | N | N | N | O | SLMWSEG | N | N | N | O |
| SMWZ | N | N | N | O | SLZMOM | N | N | N | O |
| SMWSEG | N | N | N | O | SLFMOM | N | N | N | O |
| SZMOM | N | N | N | R | SLSMOM | N | N | N | O |
| SFMOM | N | N | N | R | SLSFLOW | N | N | N | O |
| SSMOM | N | N | N | O | SLSFRAC | N | N | N | O |
| STMOM | N | N | N | O | SLEFLOW | N | N | N | O |
| SSFLOW | N | N | N | R | SLEFRAC | N | N | N | O |
| SSFRAC | N | N | N | O | | | | | |
| SEFRAC | N | N | N | O | | | | | |
| SLCB | N | N | N | O | | | | | |
| SSCB | N | N | N | O | | | | | |
| SFLCB | N | N | N | O | | | | | |
| SFSCB | N | N | N | O | | | | | |

R Required    O Optional    N Not Used    X Not Allowed

Flowsheet Stream Structure and Component Attributes

In polymer process simulation software of the present invention, principal streams include the flow rates, component composition, thermodynamic conditions, and polymer characteristics. Multiple polymer components are allowed. Each polymer component is further defined by polymer component attributes of one the above described sets. A schematic diagram of a stream data structure is given in FIG. 1. The information characterizing the principal streams in polymer processes is stored, updated, and reported by the process simulation software using the stream data structure.

In the preferred embodiment, a multidimensional array 11 is employed to represent the stream data structure. As shown in FIG. 1, stored at array entries 1 through N is the conventional component mole flow rate, where N is the total number of components in the subject stream. At array entry/index N+1, the total mole flow rate is stored. At array entry N+2, temperature and pressure indications are stored. At array entry N+4, the mass enthalpy measurement is stored. At array entries N+5 and N+6, the molar vapor and liquid fractions are indicated. At array entry N+7, the mass entropy is stored. Mass density is indicated at array entry N+8, and molecular weight is indicated at entry N+9. Array entries N+10 and N+11 hold indications of elements 1 through M of the first polymer component attribute. Array entries N+12 and N+13 hold indications of elements 1 through P of polymer component attribute K.

Depending on design of the process system being modeled, the present invention process simulation software makes certain calculations using entries stored in the stream data structure 11 and stores results in entries of the stream data structure 11 as illustrated in FIG. 2. That is, a user defines stream material, equipment/units and connections therebetween for a desired process system 15. In the preferred embodiment, an interactive task 13 prompts the user through a series of input screens to input certain design specifications. Such an interactive task and series of input screens is detailed in U.S. Pat. No. 5,008,810 assigned to the assignee of the present invention and herein incorporated by reference. Resulting from the interactive task 13 is the defined and initialized stream structure 11 and input file 29. The invention software 31 then uses values from the input file 29 to define variables in the physical property calculations and polymer kinetic calculations (among other calculations) 17, 19, 21 and to define certain initial feed stream values 33.

Next the present invention process simulation software 31 defines steady state inlet and outlet composition and flow for each piece of equipment/unit depending on polymer component attributes and surrounding conditions (including unit operating conditions). To do so, the present invention process simulation software 31 uses the attribute set, usage and definitions of Tables 1–6, makes reaction calculations for modeling/simulating the subject process 17, makes physical property calculations 19 for modeling polymer components, and calculates polymer attribute values as a function of unit operation 21, as described below.

In the preferred embodiment, process simulation software 31 of the present invention is an add-on module or layer of a general process simulator software package, such as ASPEN PLUS™ by Aspen Technology, Inc. (assignee of the present invention) or that described in U.S. patent application Ser. No. 08/242,269. The teachings of that application are herein incorporated by reference. Briefly, in such general process simulation software, each component of a user-specified process design/system is mathematically modelled. This includes each piece of equipment or unit, stream and now (with the present invention) each polymer component attribute. Interconnections amongst the components are also modelled. The simultaneous modelling of all such components and interconnections is considered to be the model of the whole subject process/system. Operating conditions at steady state of each component and interconnection, and of the overall process/system result. In particular, the simulation software enhanced by the present invention generates unit operations models, physical property models, polymerization kinetics models, phase equilibrium models, thermodynamic models and step growth models in accordance with the disclosed equations.

Physical Property Calculations and Components Attributes

A number of polymer component attributes are essential for polymer physical property and phase equilibria model calculations. These polymer component attributes include zeroth moment and first moment (or optionally, number average degree of polymerization) and segment flowrates and mole fractions. For example, the following steps are necessary to compute a physical property of a polymer solution and are employed at step 19 in FIG. 2.

1. First the segment properties are either entered by users or estimated using the properties of the functional groups which make up the segments(s).
2. Then the polymer properties are calculated from the properties of polymer segment(s) and the number average degree of polymerization and segment composition.
3. Finally, mixture properties for the polymer solution are calculated from the properties of the polymer component(s), monomer(s), solvent(s), catalyst(s), etc.

Polymer Component Attributes Handling in Unit Operations Models

Polymer component attributes have been classified into two distinct classes: Class 0 and Class 2. Class 0 attributes are derived properties defined as a function of other component attributes. Preferably Class 0 attributes are derived from Class 2 attributes. Class 0 attributes are not conserved quantities and must be recalculated each time a flow stream is flashed or mixed. Class 2 attributes have units of attribute per unit time. They are extensive quantities and must be conserved. Class 2 attributes add to the set of equations that must be solved or integrated by unit (equipment) operations models such as stirred tank reactor models or plug flow reactor models.

Component attributes are mixed or split according to their classification. When mixing, the outlet attribute value is the sum of the inlet values. When splitting, the outlet attribute values are equal to the inlet value times the split fraction. Table 7 summarizes the present invention attribute mixing and splitting rules and provides the conservation equations used to ensure balance of the inlet and outlet values.

TABLE 7

COMPONENT ATTRIBUTE HANDLING

CLASS 2 ATTRIBUTES: A/Time (Attribute Flow)

Mixing $\quad A_{out} = \Sigma A_{in}$

Splitting $\quad A_{out} = \dfrac{m_{out}}{m_{in}} A_{in}$

Conservation $\quad \dfrac{dA}{dt} = A_{in} - A_{out} + G(A)$

Class 0 Attributes: Convenience Functions
Recalculate from definition equations in Table 2 each time Class 2 attributes are manipulated.

Note: G( ) denotes reaction rate (generation).

Specifically at 21 in FIG. 2, all multiple-inlet unit operations models properly mix component attribute values. All multiple-outlet unit operations models properly split component attribute values. Flash models update component attributes prior to flash and assign attributes to each outlet stream according to splitting rules. Reactor models integrate/solve Class 2 component attributes according to correct conservation equations. They also update Class 0 attributes for reporting/diagnostics purposes.

Once the calculations converge for the steady state operation of the desired process system, the present invention software 31 forms an output report/file 35. Output report 35 presents the model calculation results of the subject process system, and in particular, reports the polymer component attributes of the polymers generated from the model/simulation.

EXAMPLE USAGE OF POLYMER COMPONENT ATTRIBUTES

To further illustrate the foregoing details of the present invention, two examples are provided below to illustrate the use of polymer component attributes in modeling polymer processes. Example 1 is that of a bulk polymerization of styrene in a plug-flow reactor by thermal initiation. Example 2 is that of the polymerization of caprolactam for the production of Nylon 6. For each example, a description of the process is provided, followed by a setup of the model input parameters, and a presentation of the model calculation results.

Example 1: Styrene Bulk Polymerization in a Plug-Flow Reactor by Thermal Initiation This example illustrates the use of polymer component attributes for modeling free-radical bulk polymerization of styrene in a tubular (plug-flow) reactor with thermal initiation. Typically in free-radical polymerization, an initiator decomposes to form free-radicals that initiate chain polymerization. Propagation reactions add successive monomer molecules to a growing polymer chain ($P_n$) to increase its chain length ($P_{n+1}$). A growing polymer chain terminates by either chain transfer or termination reactions to form dead polymer chains ($D_n$).

Styrene monomer, when heated to polymerization temperatures above 120° C., can generate enough free radicals to produce high conversion and high molecular weight polymers. Styrene reacts Via a Diels-Alder-type mechanism to form dimers which react with an additional styrene molecule to produce free radicals. The thermal initiation rate has been reported to be third-order in styrene concentration (Hui, A. W., and Hamielec, A. E., "Thermal Polymerization of Styrene at High Conversions and Temperatures. An Experimental Study," *J. of Applied Polymer Science* 16:749–769 (1972)). Hence, for this example no chemical initiators are used.

This example describes isothermal operation with the polymerization temperature maintained at 120° C. The reactor is treated as a liquid-filled system, and hence the vapor-liquid equilibrium (VLE) calculations are not included in the simulations.

Figure 3:
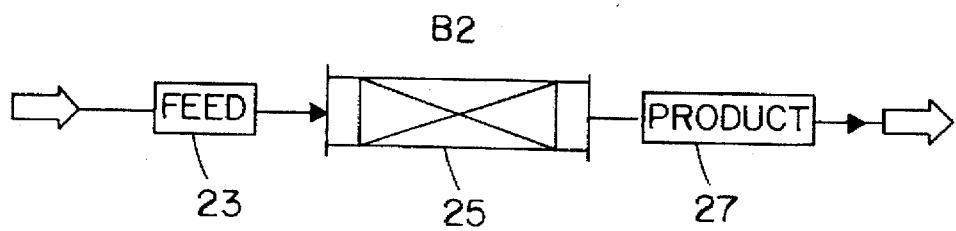
FIG. 3 is a flow diagram of the example polymerization of styrene using the present invention.

FIG. 3 shows the flow diagram for the exemplified process. Briefly, the feed stream is defined at 23 in FIG. 3. The thermophysical properties and polymerization kinetics are then determined at 25. Reaction results are produced at 27. Table IA lists the simulation inputs. Following is a description of the key simulation inputs for modeling bulk polymerization of styrene in the present invention process simulation software 31. The complete input file is given in Table IB.

TABLE I

PART A
Input Specification for Bulk Polymerization of Styrene

Feed Conditions

| | |
|---|---|
| Temperature | 120° C. |
| Pressure | 2 atm. |
| Styrene | 2.4E4 kg/hr |
| Polystyrene | 0.0 kg/hr |
| Coinitiator | 0.0 kg/hr |

Component Characterization

| Component | Type | Molecular weight |
|---|---|---|
| Styrene | Monomer | 104.15 |
| Polystyrene | Polymer | Calculated |
| — | Coinitiator | |

Physical Property Option Set
POLYNRTL
Polymerization Kinetics

| Reactions | | Rate Constant at 120° C. |
|---|---|---|
| Thermal initiation | M → R* | 2.43E-10 m⁶/kmol²/s |
| Chain initiation | R* + M → $P_1$ | 1237 m³/Kmol/S |
| Propagation | $P_n$ + M → $P_{n+1}$ | 1237 m³/Kmol/S |
| Chain transfer to monomer | $P_n$ + M → $D_n$ + $P_1$ | 0.209 m³/Kmol/S |
| Termination by combination | $P_n$ + $P_m$ → $D_{n+m}$ | 1.467E8 m³/Kmol/S |

TABLE I-continued

PART A
Input Specification for Bulk Polymerization of Styrene

Process Equipment Conditions

| | |
|---|---|
| Reactor type: | Tubular (plug flow) |
| VLE | liquid filled (no VLE calculations) |
| Length | 3100 m |
| Diameter | 0.25 m |
| Temperature | 120° C. (Isothermal) |
| Pressure | 2 atm. |

The components used in the simulations are listed below:

| Components | | Molecular Weight |
|---|---|---|
| Monomer: | Styrene | 104.15 |
| Polymer: | Polystyrene | calculated |
| Coinitiator: | Dummy defined for the induced initiation reaction, feed rate of coinitiator is set to zero | |
| Segment: | Dummy component to define segment in polymer | |

The input software language to define the components for this example is shown at the COMPONENTS paragraph in Table I Part B. In that paragraph, the INI1 and PS-SEG are dummy components and their flow rates are zero. The thermophysical properties (density, heat capacity, etc.) of styrene are obtained from a Pure Component Data Bank (predefined). The polymer thermophysical properties are initially assigned to be the same as that of styrene, but are subsequently updated using the Van Krevelen group contribution method to predict the segment and polymer properties. See Van Krevelen D. W., "Properties of Polymers, Their Correlation with Chemical Structure; Their Numerical Estimation and Prediction from Additive Group Contributions," Elsevier, New York (1990). A reference molecular weight is specified for the polymer using a PROP-DATA paragraph as shown in Table IB after the COMPONENTS paragraph. This information is optional and only affects the mole-based results in the report (output) file. The true polymer molecular weight is stored in the component attributes (stream structure 11, FIG. 1) and is used by all the calculation routines (physical property, kinetics, etc.).

Table IA lists the feed conditions for this example. The corresponding input language to define the feed stream is listed as the last paragraph, labelled "STREAM FEED" in Table I Part B. In that paragraph for this example, the feed stream is essentially all styrene with a trace amount of polymer. When polymer is included in the feed the polymer component attributes are initialized using a COMP-ATTR sentence. Only initial conditions for the class 2 attributes are required. Initial values for the class zero attributes are calculated from the class 2 attributes. The simulation may also be run with no polymer in the feed. For this case there is no need to initialize the polymer component attributes.

The Polymer Non-Random Two Liquid activity coefficient model (POLYNRTL) is used as the physical property option set together with the Van Krevelen method for predicting polymer thermophysical properties. The input language for this feature is shown below:
PROPERTIES POLYNRTL
STRUCTURES
  POLYPLUS PS-SEG 146 1/131 1/100 1
The Van Krevelen method requires specification of the segment structure in terms of Van Krevelen functional groups. This is done using the STRUCTURES paragraph above.

The kinetics of bulk and solution polymerization of styrene have been studied extensively. It has been reported (Albright, L. F., "Processes for Major Addition-Type Plastics and Their Monomers," Krieger Publishing Co., (1985)) that the molecular weight of polystyrene is primarily controlled by chain transfer to the Diels-Alder dimers and monomer. Further, based on chemical evidence and kinetic modeling, it has also been reported that termination of the growing chains occurs principally by combination over disproportionation. The specific reactions included from the built-in kinetics, values of the kinetic and gel-effect parameters used for this example are as shown below.

| Reactions | | Rate Constant at 120° C. |
|---|---|---|
| Thermal initiation | M → R* | 2.43E-10 $m^6/kmol^2/s$ |
| Chain initiation | R* + M → $P_1$ | 1237 $m^3/Kmol/S$ |
| Propagation | $P_n$ + M → $P_{n+1}$ | 1237 $m^3/Kmol/S$ |
| Chain Transfer to monomer | $P_n$ + M → $D_n$ + $P_1$ | 0.209 $m^3/Kmol/S$ |
| Termination by combination | $P_n$ + $P_m$ → $D_n$ + $D_m$ | 1.467E8 $m^3/Kmol/S$ |

Where M is the monomer styrene;

R* is a free radical;

P is the polymer polystyrene, and D are the formed dead polymer chains.

The units for the rate constants for the thermal initiation reaction is $CUM_2/KMOL_2/S$. The units for the rate constants for the other reactions are CUM/KMOL/S.

Termination Gel-effect $G_t = [\exp(-(BX_p - CX_p^2 - DX_p^3))]^2$ where $X_p$ is the weight fraction of polymer
B=2.57−0.00505T
C=9.56−0.0176T
D=−3.03+0.00785T T is the temperature (in Kelvin)

These parameters have been adapted from the literature (Hui and Hamielec, 1972 cited above); Friis, N. and Hamielec, A. E., "Gel-Effect in Emulsion Polymerization of Vinyl Monomers" ACS Symposium Series, Vol. 24 (1976). The simulation results need to be validated by adjusting the rate constants and gel effect parameters to match the plant data.

The induced initiation reaction is configured for thermal initiation by setting $b_j$ to 3 for third-order initiation. A coinitiator which is required for the induced initiation reaction is included in the list of components but its feed rate is set to zero so that it will not influence the rate for the thermal initiation reaction.

The termination reactions become diffusion limited with increasing conversion (and hence solution viscosity). A termination gel-effect factor ($G_t$) of the form shown above is included in the example simulation. The gel-effect factor is multiplied by the termination rate coefficient, such the termination rate decreases with increasing conversion.

The input language for the REACTIONS paragraph is shown in Table IB under the label "REACTIONS R1 FREE-RAD" through the line specifying the values of "GE-PARAMS=. . . ".

The input language for the plug flow reactor corresponding to the operating conditions in Table IA is provided at the paragraph beginning "BLOCK B2 RPLUG" in Table IB.

In one embodiment of the present invention, the free radical kinetics model provides additional information through a user profile vector. In order to use this feature, the dimension for the USER-VECS must be set (NREAL=1 NUSER-PROF=25) and labels provided for the elements of the user profile vector as shown below. The heat of polymerization for the monomer is specified through the first element of the REAL vector. This value is used to calculate the heat release rate (element 3 of the user profile vector).

TABLE I

PART B
Example Input File For Styrene Bulk Polymerization In A Tubular Reactor With Thermal Initiation

```
TITLE 'FREE RADICAL STYRENE POLYMERIZATION BY THERMAL
INITIATION'
DESCRIPTION 'STYRENE POLYMERIZATION IN A TUBULAR REACTOR'
SYS-OPTIONS TRACE = YES
RUN-CONTROL MAX-TIME = 1000
IN-UNITS SI TEMP = C. TIME = HR PRES = ATM MASS-FLOW = 'KG/HR'
;
;    THE COMPONENT SYSTEM DEFINITION FOLLOWS
;
COMPONENTS
    INI1      STYRENE    COINITIATOR    /  ;  COINITIATOR
    STY       STYRENE    MONOMER        /  ;  MONOMER
    PS        STYRENE    POLY-STYRENE   /  ;  POLYMER
    PS-SEG    STYRENE    STYRENE           ;  SEGMENT
PROP-DATA
    IN-UNITS SI
    PROP-LIST MW
    PVAL PS 312450       ; DPN = 3000
;
;    THE POLYMER(S) STRUCTURAL DEFINITION FOLLOWS
;
POLYMERS
    POLYMERS    PS STY-SEG        ;  DEFINE SEGMENTS IN
POLYSTYRENE
    SEGMENTS    STY-SEG REPEAT    ;  DEFINE TYPE OF
SEGMENTS PRESENT
    ;      DEFINE ATTRIBUTES FOR POLYMERS
```

TABLE I-continued

PART B
Example Input File For Styrene Bulk Polymerization In A Tubular Reactor With Thermal Initiation

```
    COMP-ATTR PS DPN DPW PDI MWN MWW ZMOM FMOM SMOM SFLOW SFRAC
POLYMERS
;
;   THE PROPERTY CALCULATION METHOD (OPTION SET)
SPECIFICATION FOLLOWS
;   THE OPTION SET CHOSEN IS A MODIFIED VERSION OF THE
ASPEN PLUS
;   NRTL OPTION SET. THIS OPTION SET ACCOUNTS FOR THE
BEHAVIOR OF
;   POLYMERS IN THE COMPONENT SYSTEM.
;
PROPERTIES POLYNRTL
STRUCTURES
    POLYPLUS PS-SEG 146 1/131 1/100 1
;
;       DEFINE POLYMERIZATION KINETICS
;
REACTIONS R1 FREE-RAD
    DESCRIPTION 'EXAMPLE FREE-RADICAL INPUT'
    REFERENCE B2
    SPECIES COINITIATOR = INI1 MONOMER = STY POLYMER = PS
;
;   RATE COEFFICIENT PARAMETERS FOR MODIFIED ARRHENIUS EXPRESSION
;                                       ACTIVATION   ACTIVATION
;                           FREQUENCY   ENERGY       VOLUME
;                           FACTOR      (J/KMOL)     (CUM)
    INIT-SP STY     INI1    4.38E5      1.148E8      0.D0
    CHAIN-INI       STY     1.051E7     2.957E7      0.D0
    PROPAGATION     STY STY 1.051E7     2.957E7      0.D0
    CHAT-MON        STY STY 2.31E6      5.302E7      0.D0
    TERM-COMB       STY STY 1.255E9     7.017E6      0.D0
    INIT-SP-EFF     STY     1.0         3.0          1.0
    GEL-EFFECT      GETYPE = TERMINATION CORR-NO = 2 MAX-PARAMS = 10 &
        GE-PARAMS = 1 0 2.57 −5.05E-3 9.56 −1.76E-2 −3.03 7.85E-3 0.0 2
;
;       DEFINE FLOWSHEET INFORMATION
;
FLOWSHEET
    BLOCK B2 IN = FEED OUT = PRODUCT
BLOCK B2 RPLUG
    PARAM TYPE = T-SPEC LENGTH = 3100 DIAM = 0.25 PRES = 2 &
            PHASE = L INT-TOL = 1.E-5 HINIT = 0.1E-6 &
            COMP-ATTR = YES    USER-PROF = YES    PRINT-USERP = YES
    SUBROUTINE KINETICS = USRPK5
    USER-VECS NREAL = 1    NINT = 1    NUSER-PROF = 25
    INT     1000        ; Printing freq. for history file info
    REAL    16700       ; Heat of polym. (kcal/kmole)
    USER-PROF   'CONVERSION'        'FRACTION'      /
                'PROPAGA. RT'       'KMOL/S/CUM'    /
                'HEAT OF POLYM'     'KCAL/S/CUM'    /
                'VOLUME FLOW'       'CUM/S'         /
                'MOLE FLOW'         'KMOL/S'        /
                'AVG. MW'           'KG/KMOLES'     /
                'TERM-COMB RT'      'KMOL/S/CUM'    /
                'TERM-DISP RT'      'KMOL/S/CUM'    /
                'INHIBI RT'         'KMOL/S/CUM'    /
                'RAD-GEN RT'        'KMOL/S/CUM'    /
                'SP-INIT RT'        'KMOL/S/CUM'    /
                'CTM RT'            'KMOL/S/CUM'    /
                'CTP RT'            'KMOL/S/CUM'    /
                'CTA RT'            'KMOL/S/CUM'    /
                'CTS RT'            'KMOL/S/CUM'    /
                'B-SCISS RT'        'KMOL/S/CUM'    /
                'SCB RT'            'KMOL/S/CUM'    /
                'CONC INIT'         'KMOL/CUM'      /
                'CONC CAT'          'KMOL/CUM'      /
                'CONC COINI'        'KMOL/CUM'      /
                'CONC MON'          'KMOL/CUM'      /
                'CONC CTA'          'KMOL/CUM'      /
                'CONC SOL'          'KMOL/CUM'      /
                'CONC INHIB'        'KMOL/CUM'      /
                'CONC POL'          'KMOL/CUM'
STREAM FEED
    SUBSTREAM MIXED TEMP = 120 PRES = 2 MASS-FLOW = 2.4E4
    MASS-FRAC STY 0.999999999 / PS 0.0000000001 / INI1 0.0
```

TABLE I-continued

PART B
Example Input File For Styrene Bulk Polymerization In A Tubular Reactor With Thermal Initiation

| COMP-ATTR PS | ZMOM (0.39E-10) | / |
| | FMOM (1.17E-7) | / |
| | SMOM (7.02E-4) | / |
| | SFLOW (1.17E-7) | |

Selected Simulation Results

The polymerization model reports the polymer component attributes and the user profile variables. The information is reported over the reactor length amongst other output reported.

Tables IIA, B and C show sections of the report file. Table IIA lists the results for the user profile variables such as, monomer conversion, rate of polymerization, heat release rate due to polymerization, etc., as a function of reactor length. Table IIB lists some of the results for the polymer component attributes (e.g., number and weight average degree of polymerization, polydispersity index and the number average molecular weight). The stream report section is shown in Table IIC.

The simulation results fit the conversion data reported by Hui, A. W., Hamielec, A. E., "Thermal Polymerization of Styrene at High Conversions and Temperatures. An Experimental Study," *J. of Applied Polymer Science*, 16:749–769 (1972). The predicted average molecular weights show some difference due to chain transfer to Diels Alder adduct which was not accounted for in the simulation.

Typically for free-radical polymerization systems with chain transfer to monomer controlling the MWD, the polydispersity index should be close to 2. However, with termination by combination controlling the molecular weight, the polydispersity index should be close to 1.5. For this example simulation, the polydispersity increases from about 1.7 to 1.86 indicating that for the specified kinetics and termination gel-effect the molecular weight becomes increasingly controlled by chain transfer to monomer at high conversion.

TABLE II

PART A
Simulation Results for the Reactor Performance Variables

FREE RADICAL BULK POLYMERIZATION OF STYRENE BY THERMAL INITIATIO

BLOCK: B2   U-O-S BLOCK SECTION
MODEL: RPLUG (CONTINUED)
* RESULTS PROFILES *
 USER SPECIFIED DEPENDENT VARIABLES 
 FROM USER KINETICS SUBROUTINE

USER SPECIFIED DEPENDENT VARIABLES

| TIME SEC | CONVERSION FRACTION | PROPAGA. RT KMOL/S/CUM | HEAT OF POLY KCAL/S/CUM | VOLUME FLOW CUM/S |
|---|---|---|---|---|
| 0.00000E+00 | 0.00000E+00 | 0.00000E+00 | 0.00000E+00 | 0.00000E+00 |
| 310.00 | 0.62895E-01 | 0.25318E-03 | 4.2282 | 0.80646E-02 |
| 620.00 | 0.12090 | 0.23526E-03 | 3.9288 | 0.79870E-02 |
| 930.00 | 0.17511 | 0.22110E-03 | 3.6924 | 0.79145E-02 |
| 1240.0 | 0.22628 | 0.20950E-03 | 3.4987 | 0.78461E-02 |
| 1550.0 | 0.27490 | 0.19965E-03 | 3.3341 | 0.77811E-02 |
| 1860.0 | 0.32133 | 0.19096E-03 | 3.1891 | 0.77190E-02 |
| 2170.0 | 0.36579 | 0.18302E-03 | 3.0564 | 0.76596E-02 |
| 2480.0 | 0.40843 | 0.17546E-03 | 2.9303 | 0.76026E-02 |
| 2790.0 | 0.44926 | 0.16805E-03 | 2.8064 | 0.75479E-02 |
| 3100.0 | 0.48832 | 0.16057E-03 | 2.6814 | 0.74957E-02 |

USER SPECIFIED DEPENDENT VARIABLES

| TIME SEC | MOLE FLOW KMOL/S | AVG. MW KG/KMOLES | TERM-COMB RT KMOL/S/CUM | TERM-DISP RT KMOL/S/CUM |
|---|---|---|---|---|
| 0.00000E+00 | 0.00000E+00 | 0.00000E+00 | 0.00000E+00 | 0.00000E+00 |
| 310.00 | 0.59986E-01 | 111.14 | 0.10080E-06 | 0.00000E+00 |
| 620.00 | 0.56274E-01 | 118.47 | 0.85666E-07 | 0.00000E+00 |
| 930.00 | 0.52805E-01 | 126.25 | 0.72737E-07 | 0.00000E+00 |
| 1240.0 | 0.49531E-01 | 134.60 | 0.61608E-07 | 0.00000E+00 |
| 1550.0 | 0.46420E-01 | 143.62 | 0.51990E-07 | 0.00000E+00 |
| 1860.0 | 0.43449E-01 | 153.44 | 0.43665E-07 | 0.00000E+00 |
| 2170.0 | 0.40603E-01 | 164.19 | 0.36469E-07 | 0.00000E+00 |
| 2480.0 | 0.37875E-01 | 176.02 | 0.30269E-07 | 0.00000E+00 |

TABLE II-continued

PART A
Simulation Results for the Reactor Performance Variables

| | | | | |
|---|---|---|---|---|
| 2790.0 | 0.35262E−01 | 189.06 | 0.24957E−07 | 0.00000E+00 |
| 3100.0 | 0.32762E−01 | 203.49 | 0.20436E−07 | 0.00000E+00 |

TABLE II

PART B
Simulation Results for the Reactor Performance Variables

FREE RADICAL BULK POLYMERIZATION OF STYRENE BY THERMAL INITIATIO
U-O-S BLOCK SECTION
BLOCK: B2   MODEL: RPLUG (CONTINUED)
* COMPONENT ATTRIBUTE PROFILE (PROCESS SUBSTREAM) *

| LENGTH METER | POLY-STY DPN DPN | POLY-STY DPW DPW | POLY-STY PDI PDI | POLY-STY MWN MWN |
|---|---|---|---|---|
| 0.00000E+00 | 3000.0 | 6000.0 | 2.0000 | 0.31246E+06 |
| 310.00 | 2664.7 | 4655.9 | 1.7473 | 0.27753E+06 |
| 620.00 | 2721.3 | 4773.5 | 1.7541 | 0.28343E+06 |
| 930.00 | 2781.9 | 4902.9 | 1.7625 | 0.28974E+06 |
| 1240.0 | 2845.2 | 5042.9 | 1.7724 | 0.29633E+06 |
| 1550.0 | 2910.4 | 5192.2 | 1.7840 | 0.30313E+06 |
| 1860.0 | 2976.8 | 5349.6 | 1.7971 | 0.31004E+06 |
| 2170.0 | 3043.7 | 5513.6 | 1.8115 | 0.31700E+06 |
| 2480.0 | 3110.2 | 5682.4 | 1.8270 | 0.32393E+06 |
| 2790.0 | 3175.7 | 5853.9 | 1.8433 | 0.33076E+06 |
| 3100.0 | 3239.6 | 6026.1 | 1.8601 | 0.33742E+06 |

| LENGTH METER | POLY-STY MWW MWW | POLY-STY ZMOM ZMOM | POLY-STY FMOM FMOM | POLY-STY SMOM SMOM |
|---|---|---|---|---|
| 0.00000E+00 | 0.62491E+06 | 0.39000E−10 | 0.11700E−06 | 0.70200E−03 |
| 310.00 | 0.48492E+06 | 0.15109E−05 | 0.40261E−02 | 18.745 |
| 620.00 | 0.49717E+06 | 0.28437E−05 | 0.77387E−02 | 36.941 |
| 930.00 | 0.51065E+06 | 0.40293E−05 | 0.11209E−01 | 54.957 |
| 1240.0 | 0.52523E+06 | 0.50907E−05 | 0.14484E−01 | 73.042 |
| 1550.0 | 0.54078E+06 | 0.60460E−05 | 0.17597E−01 | 91.365 |
| 1860.0 | 0.55717E+06 | 0.69095E−05 | 0.20569E−01 | 110.03 |
| 2170.0 | 0.57425E+06 | 0.76928E−05 | 0.23414E−01 | 129.10 |
| 2480.0 | 0.59183E+06 | 0.84055E−05 | 0.26142E−01 | 148.55 |
| 2790.0 | 0.60970E+06 | 0.90552E−05 | 0.28757E−01 | 168.34 |
| 3100.0 | 0.62763E+06 | 0.96486E−05 | 0.31258E−01 | 188.36 |

| LENGTH METER | POLY-STY SFLOW STY-SEG | POLY-STY SFRAC STY-SEG |
|---|---|---|
| 0.00000E+00 | 0.11700E−06 | 1.0000 |
| 310.00 | 0.40261E−02 | 1.0000 |
| 620.00 | 0.77387E−02 | 1.0000 |
| 930.00 | 0.11209E−01 | 1.0000 |
| 1240.0 | 0.14484E−01 | 1.0000 |
| 1550.0 | 0.17597E−01 | 1.0000 |
| 1860.0 | 0.20569E−01 | 1.0000 |
| 2170.0 | 0.23414E−01 | 1.0000 |
| 2480.0 | 0.26142E−01 | 1.0000 |
| 2790.0 | 0.28757E−01 | 1.0000 |
| 3100.0 | 0.31258E−01 | 1.0000 |

TABLE II

PART C
STREAM REPORT
FREE RADICAL BULK
POLYMERIZATION OF STYRENE BY THERMAL INITIATIO
STREAM SECTION

| FEED PRODUCT STREAM ID | FEED | PRODUCT |
|---|---|---|
| FROM: | — | B2 |
| TO: | B2 | — |
| SUBSTREAM: MIXED | | |
| PHASE: | LIQUID | LIQUID |
| COMPONENTS: KMOL/SEC | | |
| COINITIA | 0.0 | 0.0 |
| STYRENE | 6.4010–02 | 3.2752–02 |
| POLY-STY | 2.1337–15 | 1.0419–05 |
| STY-SEG | 0.0 | 8.4783–30 |
| COMPONENTS: KG/HR | | |
| COINITIA | 0.0 | 0.0 |
| STYRENE | 2.4000+04 | 1.2280+04 |
| POLY-STY | 2.4000–06 | 1.1720+04 |
| STY-SEG | 0.0 | 3.1789–24 |
| TOTAL FLOW: | | |
| KMOL/SEC | 6.4010–02 | 3.2763–02 |
| KG/HR | 2.4000+04 | 2.4000+04 |
| CUM/SEC | 8.1487–03 | 7.4957–03 |
| STATE VARIABLES: | | |
| TEMP C. | 120.0000 | 120.0000 |
| PRES ATM | 2.0000 | 2.0000 |
| VFRAC | 0.0 | 0.0 |
| LFRAC | 1.0000 | 1.0000 |
| SFRAC | 0.0 | 0.0 |
| ENTHALPY: | | |
| J/KMOL | 1.2254+08 | 1.9194+08 |
| J/KG | 1.1765+06 | 9.4330+05 |
| WATT | 7.8436+06 | 6.2886+06 |
| ENTROPY: | | |
| J/KMOL-K | –2.7613+05 | –2.7023+05 |
| J/KG-K | –2651.2632 | –1328.0391 |
| DENSITY: | | |
| KMOL/CUM | 7.8552 | 4.3708 |
| KG/CUM | 818.1257 | 889.3981 |
| AVG MW | 104.1500 | 203.4831 |
| COMPONENT ATTRIBUTES: | | |
| POLY-STY DPN | | |
| DPN | 3000.0000 | 3239.6479 |
| DPW | | |
| DPW | 6000.0000 | 6026.0750 |
| PDI | | |
| PDI | 2.0000 | 1.8601 |
| MWN | | |
| MWN | 3.1246+05 | 3.3742+05 |
| MWW | | |
| MWW | 6.2491+05 | 6.2763+05 |
| ZMOM | | |
| ZMOM | 3.9000–11 | 9.6486–06 |
| FMOM | | |
| FMOM | 1.1700–07 | 3.1258–02 |
| SMOM | | |
| SMOM | 7.0200–04 | 188.3632 |
| SFLOW | | |
| STY-SEG | 1.1700–07 | 3.1258–02 |
| SFRAC | | |
| STY-SEG | 1.0000 | 1.0000 |

Example 2: Caprolactam Polymerization To Nylon 6

Nylon 6 is industrially produced on a large scale for synthetic fibers, films, plastics, etc. It is obtained by polymerizing caprolactam in the presence of water, and the continuous process is commonly used to produce Nylon 6. The simulation of the process plays an important role in quality control, modification of the existing plants, development of a new process, etc. This example illustrates the use of the present invention for modeling the hydrolytic polymerization of caprolactam in a series of two CSTRs (continuous stirred tank reactors) followed by a plug flow reactor.

The feed to the first reactor contains caprolactam and water. When the mixture is heated to temperatures above 220°–260° C., three main equilibrium reactions occur: (1) ring opening of caprolactam, (2) polycondensation of the end groups, and (3) polyaddition of caprolactam. This example considers all these reactions in the Nylon model.

Figure 4:
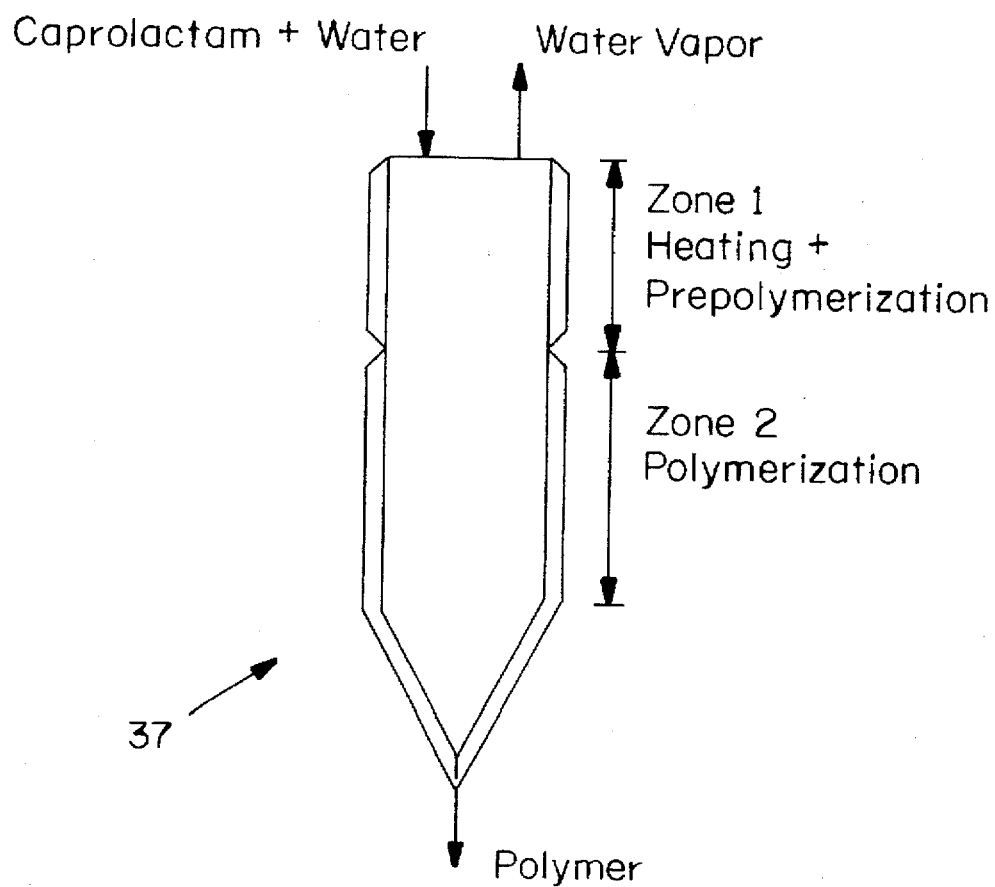
FIG. 4 is a schematic view of a VK column used in the example of caprolactam polymerization using the present invention.

The conventional VK column 37 is commonly employed to produce Nylon 6 (FIG. 4). The reactor 37 is essentially a vertical tube operating under atmospheric pressure. A mixture of caprolactam, water and stabilizer is continuously fed to the top of the column 37. The ring opening reaction initiates the polymerization in zone 1, and excess water is evaporated in this zone. In zone 2, polymerization proceeds under near adiabatic conditions. No water is evaporated in this zone.

Figure 5:
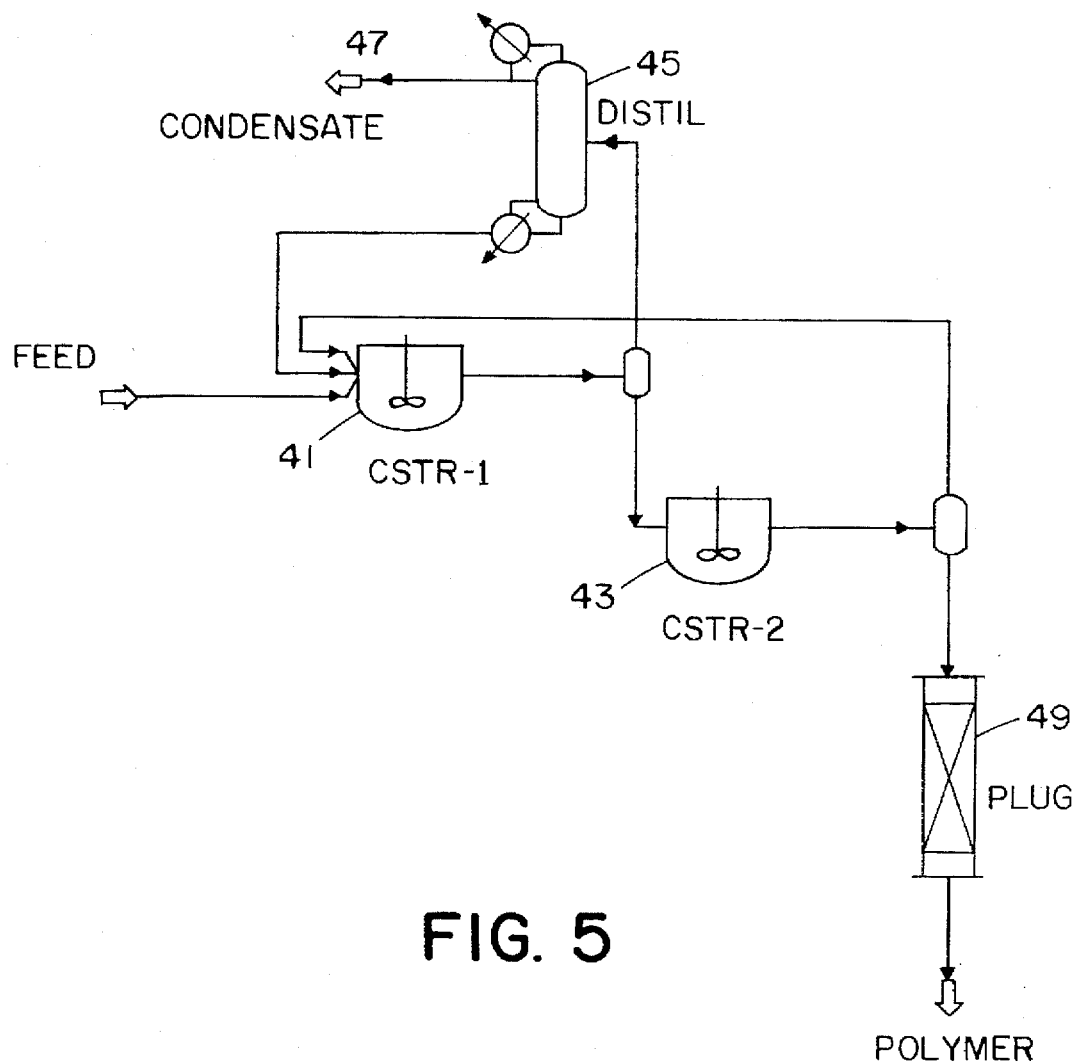
FIG. 5 is a flow diagram for the example caprolactam polymerization of FIG. 4.

FIG. 5 shows the process flow diagram to model the Nylon 6 process. The top portion (Zone 1) of the reactor 37 is considered to be like two stirred tank reactors 43. The vapor coming out of the first reactor 41 is sent to the distillation column 45. The caprolactam from the distillation column 45 is recycled to the first reactor and the condensate water is removed (at 47). The vapor from the second reactor 43 is sent to the first reactor 41. A plug flow reactor 49 is coupled to the second reactor 43 and produces the sought polymer Nylon 6.

Table III Part A lists the simulation inputs. Each of the input areas are defined by a respective paragraph in the input file illustrated in Table III Part C, similar to that of Example 1, Table I Parts A and B.

TABLE III

PART A
INPUT SPECIFICATIONS FOR CAPROLACTAM POLYMERIZATION

Component Characterization

| Component | Type |
|---|---|
| Caprolactam | Monomer |
| Water | Catalyst |
| Nylon | Polymer |
| Aminocaproic acid | Monomer |

Feed Conditions

| | |
|---|---|
| Temperature | 260° C. |
| Pressure | 1 atm |
| Caprolactam | 97.0% by weight |
| Water | 1.0% by weight |

Physical Property Option Set

POLYNRTL

Polymerization Kinetics

1. Ring-opening

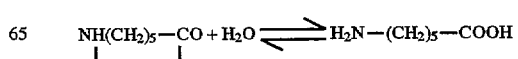

TABLE III-continued

PART A
INPUT SPECIFICATIONS FOR CAPROLACTAM POLYMERIZATION

2. Polycondensation $$\sim NH_2 + HOOC \sim \rightleftharpoons \sim NHCO \sim + H_2O$$

3. Polyaddition $$\sim NH_2 + CO-(CH_2)_5-NH \rightleftharpoons \sim NHCO-(CH_2)_5-NH_2$$

Process Conditions

Reactor type Two CSTRs followed by a PLUG Flow reactor
VLE VLE (vapor liquid equilibrium) calculations are done for CSTR-1 and CSTR-2; liquid filled for PLUG flow reactor (no VLE calculations).
Temperature 260° C.
Pressure 1 atm.

A set of rate parameters reported in the literature are used in this example and are given in Table IIIB. See K. Tai and T. Tagawa, "Simulation of Hydrolytic Polymerization of Caprolactam in Various Reactors. A review on recent advances in reaction engineering of polymerization", I&EC Product Research and Development, Vol. 22, p. 192, (1983). K. Tai, Y. Arai and T. Tagawa, "The Simulation of Hydrolytic Polymerization of Caprolactam in Various Reactors". *Journal Appl. Polymer Science*, Vol. 22, p. 731, (1982). P. J. Hotyzer, J. Hoogschagen and D. W. Van Krevelen, "Optimization of Caprolactam Polymerization", *Chemical Engineering Science*, Vol. 20, p. 247, (1965). A. K. Gupta and K. S. Gandhi, "Modeling of Backmixing in Continuous Polymerization of Caprolactam in VK Column Reactors", *Ind. Eng. Chem. Product Research and Development*, Vol. 24, p. 327, (1985). H. K. Reimschuessel, "Nylon 6: chemistry and mechanisms", *J. Polymerization Science: Macromolecular Reviews*, Vol. 12, p. 65, (1977).

The main polycondensation reaction is modeled using the step growth kinetics. Ring opening and polyaddition are modelled using the user kinetics. These two reactions result in 12 user reactions. These are forward and reverse reactions for the uncatalyzed and catalyzed by the carboxyl ends of the polymer and aminocproic acid.

TABLE III

PART B
RATE PARAMETERS USED IN THE SIMULATION

|  |  | $A_o$ | $E_o$ | $A_c$ | $E_c$ |
|---|---|---|---|---|---|
| Ring opening | (f) | $5.9874 \times 10^5$ | 19.88 | $4.3075 \times 10^7$ | 18.806 |
|  | (r) | $3.1663 \times 10^7$ | 17.962 | $2.2779 \times 10^9$ | 16.88 |
| Poly- | (f) | $1.8942 \times 10^{10}$ | 23.271 | $1.2114 \times 10^{10}$ | 20.670 |
| condensation | (r) | $1.17802 \times 10^{10}$ | 29.216 | $7.5338 \times 10^9$ | 26.616 |
| Polyaddition | (f) | $2.8558 \times 10^9$ | 22.845 | $1.6377 \times 10^{10}$ | 20.107 |
|  | (r) | $9.4153 \times 10^{10}$ | 26.888 | $5.3993 \times 10^{11}$ | 26.151 | o, Uncatalyzed
c, Catalyzed
f, forward reaction
r, reversible reaction
Units:
$A_o$, kg mol$^{-1}$h$^{-1}$
$A_c$, kg$^2$ mol$^{-2}$h$^{-1}$
$E_o$ and $E_c$, kcal/mol

TABLE III

PART C
EXAMPLE INPUT FILE FOR CAPROLACTAM POLYMERIZATION

TITLE 'Caprolactam Polymerization'
IN-UNITS SI MASS-FLOW='KG/HR' MOLE-FLOW='KMOL/HR' &
    VOLUME-FLOW='L/HR' PRESSURE=ATM TEMPERATURE=C. TIME=HR &
    VOLUME=L MOLE-ENTHALP='KCAL/MOL' MOLE-ENTROPY='KCAL/MOL-K' &
    INVERSE-TIME='1/HR' LN-INV-TIME='LN(1/HR)'
DEF-STREAMS CONVEN ALL
RUN-CONTROL MAX-TIME=15000.0
DESCRIPTION "Modeling of NYLON 6 Process "
;————————————————————————
DATABANKS ASPENPCD / DIPPRPCD
PROP-SOURCES ASPENPCD / DIPPRPCD
;———————— PHYSICAL PROPERTIES ————————
COMPONENTS
    H2O H2O H2O /
    CL C6H11NO CL /
    ACA C6H11NO ACA /
    NYLON C6H11NO NYLON /
    T-NH2 C6H11NO T-NH2 /
    T-COOH C6H11NO T-COOH /
    B-ACA C6H11NO B-ACA
;————————————FLOWSHEET————————————
FLOWSHEET
    BLOCK CSTR1 IN=FEED RECYCLE R2-COND OUT=R1OUT
    BLOCK DISTIL IN=R1VAP OUT=COND RECYCLE
    BLOCK CSTR2 IN=R1-OLIGO OUT=R2OUT TABLE III-continued

PART C
EXAMPLE INPUT FILE FOR CAPROLACTAM POLYMERIZATION

```
    BLOCK R1FLASH IN=R1OUT OUT=R1VAP R1-OLIGO
    BLOCK R2FLASH IN=R2OUT OUT=R2-COND R2-OLIGO
    BLOCK PLUG IN=R2-OLIGO OUT=POLYMER
PROPERTIES POLYNRTL
PROP-DATA MW
    IN-UNITS SI MASS-FLOW='KG/HR' MOLE-FLOW='KMOL/HR' &
        VOLUME-FLOW='L/HR' PRESSURE=ATM TEMPERATURE=C. TIME=HR &
        VOLUME=L MOLE-ENTHALP='KCAL/MOL' MOLE-ENTROPY='KCAL/MOL-K' &
        INVERSE-TIME='1/HR' LN-INV-TIME='LN(1/HR)'
    PROP-LIST MW
    PVAL H20 18.0
    PVAL ACA 131.0
    PVAL CL 113.0
    PVAL T-NH2 114.0
    PVAL T-COOH 130.0
    PVAL B-ACA 113.0
    PVAL NYLON 113.0
PROP-DATA MW
    IN-UNITS SI PRESSURE=ATM
    PROP-LIST PLXANT
    PVAL NYLON −40.0 .0 .0
    PVAL H20 11.6703 −3814.44 −46.13
    PVAL CL 13.006 −7024.023 0.0
    PVAL ACA −40 0 0
STRUCTURES
    VANKREV B-ACA 174 1 / 100 5
    VANKREV T-COOH 100 5 / 160 1 / 174 1
    VANKREV T-NH2 150 1 / 100 5 / 168 1
POLYMERS
    SEGMENTS T-NH2 END / T-COOH END / B-ACA
    POLYMER NYLON
    COMP-ATTR NYLON SFLOW ZMOM FMOM DPN MWN EFRAC SFRAC
REACTIONS NYLON STEP-GROWTH
    REFERENCE CSTR1 / CSTR2 / PLUG
    SPECIES POLYMER=NYLON
    SG-RATE-CON ELECTRO-GRP=TNH2 NUCLEO-GRP=TCOOH &
        PRE-EXP=1.8942E+10 ACT-ENERGY=23.271
    SG-RATE-CON ELECTRO-GRP=TNH2 NUCLEO-GRP=TCOOH &
        CATALYST-GRP=TCOOH PRE-EXP=1.2114E+10 ACT-ENERGY=20.670
    SG-RATE-CON NUCLEOPHILE=H2O PRE-EXP=1.17802E10 &
        ACT-ENERGY=29.21680
    SG-RATE-CON NUCLEOPHILE=H2O CATALYST-GRP=TCOOH &
        PRE-EXP=7.5338E9 ACT-ENERGY=26.61580
    REAC-GROUP TNH2 E-GRP / TCOOH N-GRP / BCAP EN-GRP
    SPECIES-GRP T-NH2 TNH2 1 / T-NH2 BCAP 1 / T-COOH TCOOH &
        1 / T-COOH BCAP 1 / ACA TNH2 1 / ACA TCOOH 1 / &
        ACA BCAP 1 / B-ACA BCAP 1 / H2O TNH2 1 / H2O &
        TCOOH 1
    STOIC 1 CL -1.0 / H2O -1.0 / ACA 1.0
    STOIC 2 CL -1.0 / H2O -1.0 / T-COOH .0 / T-COOH .0 / &
        ACA 1.0
    STOIC 3 ACA -1.0 / CL 1.0 / H2O 1.0
    STOIC 4 ACA -1.0 / T-COOH .0 / T-COOH .0 / CL 1.0 / &
        H2O 1.0
    STOIC 5 CL -1.0 / T-NH2 .0 / T-NH2 .0 / B-ACA 1.0
    STOIC 6 CL -1.0 / T-NH2 .0 / T-COOH .0 / T-NH2 .0 / &
        T-COOH .0 / B-ACA 1.0
    STOIC 7 T-NH2 .0 / B-ACA -1.0 / T-NH2 .0 / CL 1.0
    STOIC 8 T-NH2 .0 / B-ACA -1.0 / T-COOH .0 / T-NH2 .0 &
        / T-COOH .0 / CL 1.0
    STOIC 9 CL -1 / H2O -1 / ACA 0 / ACA 1
    STOIC 10 ACA -1 / CL 1 / H2O 1
    STOIC 11 CL -1 / T-NH2 0 / ACA 0 / T-NH2 0 / B-ACA &
        1 / ACA 0
    STOIC 12 T-NH2 0 / B-ACA -1 / ACA 0 / CL 1 / T-NH2 &
        0 / ACA 0
    RATE-CON 1 5.9874E5 19.880
    RATE-CON 2 4.3075E7 18.806
    RATE-CON 3 3.1663E7 17.9620
    RATE-CON 4 2.2779E9 16.8880
    RATE-CON 5 2.85600E+9 22.845
    RATE-CON 6 1.6380E+10 20.110
    RATE-CON 7 9.4153E10 26.8880
    RATE-CON 8 5.3993E11 24.15080
    RATE-CON 9 4.3075E7 18.806
    RATE-CON 10 2.2779E9 16.88
```

TABLE III-continued

PART C
EXAMPLE INPUT FILE FOR CAPROLACTAM POLYMERIZATION

```
    RATE-CON 11 1.6377E10 20.107
    RATE-CON 12 5.3993E11 24.1508
    POWLAW-EXP 1 CL 1.0 / H2O 1.0
    POWLAW-EXP 2 CL 1.0 / H2O 1.0 / T-COOH 1.0
    POWLAW-EXP 3 ACA 1.0
    POWLAW-EXP 4 ACA 1.0 / T-COOH 1.0
    POWLAW-EXP 5 CL 1.0 / T-NH2 1.0
    POWLAW-EXP 6 CL 1.0 / T-NH2 1.0 / T-COOH 1.0
    POWLAW-EXP 7 T-NH2 1.0
    POWLAW-EXP 8 T-NH2 1.0 / T-COOH 1.0
    POWLAW-EXP 9 CL 1 / H2O 1 / ACA 1
    POWLAW-EXP 10 ACA 2 / H2O 1
    POWLAW-EXP 11 CL 1 / T-NH2 1 / ACA 1
    POWLAW-EXP 12 T-NH2 1 / ACA 1
PROP-SET ACT GAMMA SUBSTREAM=MIXED COMPS=NYLON H2O CL PHASE=L
PROP-SET P1 RHO UNITS='KG/CUM' SUBSTREAM=MIXED COMPS=NYLON H2O &
    CL PHASE=L
PROP-SET PV-CAP PL UNITS='ATM' SUBSTREAM=MIXED COMPS=CL &
    PHASE=L
PROP-SET PV-H2O PL UNITS='ATM' SUBSTREAM=MIXED COMPS=H2O &
    PHASE=L
STREAM FEED
    SUBSTREAM MIXED TEMP=260 PRES=1.0 MASS-FLOW=40 NPHASE=1 &
        PHASE=L
    MASS-FRAC H2O .01 / CL .99
BLOCK R1FLASH FLASH2
    PARAM PRES=1.0 DUTY=0
BLOCK R2FLASH FLASH2
    PARAM PRES=1.0 DUTY=0.0
BLOCK DISTIL RADFRAC
    PARAM NSTAGE=20
    FEEDS R1VAP 21
    PRODUCTS COND 1 L / RECYCLE 20 L
    P-SPEC 1 1.0
    COL-SPECS QN=0.0 MASS-RDV=0.0 MOLE-RR=3.0
BLOCK CSTR1 RCSTR
    DESCRIPTION "CAPROLACTAM POLYMERIZATION"
    SUBROUTINE KINETICS=USRPK5
    PARAM VOL=75 TEMP=260 PRES=1.0 NPHASE=1 PHASE=L &
        MB-MAXIT=150 MB-TOL=1.0E-5 DAMP-FAC=.1
    FLOW-EST MIXED CL .1063 / H2O .182 / NYLON .3785 / ACA &
        3.07E-4
    STOIC 1 MIXED CL -1.0 / H2O -1.0 / ACA 1.0
    STOIC 2 MIXED ACA -1.0 / NYLON 1.0 / H2O 1.0
    STOIC 3 MIXED CL -1.0 / NYLON 1.0
BLOCK CSTR2 RCSTR
    SUBROUTINE KINETICS=USRPK5
    PARAM VOL=75 TEMP=260 PRES=1.0 NPHASE=1 PHASE=L &
        MB-TOL=1.0E-5 DAMP-FAC=.1
    FLOW-EST MIXED H2O .00352 / CL .00553 / ACA 3.97E-5 / &
NYLON .424
BLOCK PLUG RPLUG
    SUBROUTINE KINETICS=USRPK5
    PARAM TYPE=T-SPEC LENGTH=500 DIAM=.0356825 PHASE=L PRES=1.0 &
        NPOINT=20 INT-TOL=. 00001 COMP-ATTR=YES FLASH=YES
    COOLANT TOL=.00001
    T-SPEC 0 260 / 1 260
    STOIC 1 MIXED CL -1 / H2O -1 / ACA 1
    STOIC 2 MIXED ACA -1 / NYLON 1 / H2O 1
    STOIC 3 MIXED CL -1 / NYLON 1
    PROPERTIES POLYNRTL
    REPORT REPORT RESULTS
    PROP-REPORT PRINT-PLOT=NO
SENSITIVITY FLOW
    PARAM BASE-CASE=NO
    DEFINE R1CL MASS-FLOW STREAM=R1OUT SUBSTREAM=MIXED &
        COMPONENT=CL
    DEFINE R1NYL MASS-FLOW STREAM=R1OUT SUBSTREAM=MIXED &
        COMPONENT=NYLON
    DEFINE R1DP COMP-ATTR-VAR STREAM=R1OUT SUBSTREAM=MIXED &
        COMPONENT=NYLON ATTRIBUTE=DPN ELEMENT=1
    DEFINE R2CL MASS-FLOW STREAM=R2OUT SUBSTREAM=MIXED &
        COMPONENT=CL
    DEFINE R2NYL MASS-FLOW STREAM=R2OUT SUBSTREAM=MIXED &
        COMPONENT=NYLON
    DEFINE R2DP COMP-ATTR-VAR STREAM=R2OUT SUBSTREAM=MIXED &
```

TABLE III-continued

PART C
EXAMPLE INPUT FILE FOR CAPROLACTAM POLYMERIZATION

```
    COMPONENT=NYLON ATTRIBUTE=DPN ELEMENT=1
 DEFINE R3DP COMP-ATTR-VAR STREAM=POLYMER SUBSTREAM=MIXED &
    COMPONENT=NYLON ATTRIBUTE=DPN ELEMENT=1
 DEFINE R3CL MASS-FLOW STREAM=POLYMER SUBSTREAM=MIXED &
    COMPONENT=CL
 DEFINE R3NYL MASS-FLOW STREAM=POLYMER SUBSTREAM=MIXED &
    COMPONENT=NYLON
 DEFINE R3ACA MASS-FLOW STREAM=POLYMER SUBSTREAM=MIXED &
    COMPONENT=ACA
 DEFINE R3F STREAM-VAR STREAM=FEED SUBSTREAM=MIXED &
    VARIABLE=MASS-FLOW
 DEFINE R1COND MASS-FLOW STREAM=COND SUBSTREAM=MIXED &
    COMPONENT=H2O
 DEFINE R3FW MASS-FRAC STREAM=R2-OLIGO SUBSTREAM=MIXED &
    COMPONENT=H2O
 DEFINE R2COND MASS-FLOW STREAM=R2-COND SUBSTREAM=MIXED &
    COMPONENT=H2O
 DEFINE R2FW MASS-FRAC STREAM=R1-OLIGO SUBSTREAM=MIXED &
    COMPONENT=H2O
 DEFINE FWF MASS-FRAC STREAM=FEED SUBSTREAM=MIXED &
    COMPONENT=H2O
 DEFINE R3H2O MASS-FLOW STREAM=POLYMER SUBSTREAM=MIXED &
    COMPONENT=H2O
 F      EV = (R3CL+R3H2O+R3ACA)/R3F*100
 TABULATE 1 "R1NYL/ (R1NYL+R1CL)" COL-LABEL="R1-CONV"
 TABULATE 2 "R2NYL/ (R2NYL+R2CL)" COL-LABEL="R2-CONV"
 TABULATE 3 "R3NYL/ (R3NYL+R3CL)" COL-LABEL="R3-CONV"
 TABULATE 4 "R1DP" COL-LABEL="R1-DP"
 TABULATE 5 "R2DP" COL-LABEL="R2-DP"
 TABULATE 6 "R3DP" COL-LABEL="R3-DP"
 TABULATE 7 "EV" COL-LABEL="EXTRACTE"
 TABULATE 8 "FWF*100." COL-LABEL="FEED WF" "WATER" "PERCENT."
 TABULATE 9 "IR2FW*100." COL-LABEL="R2OUT" "WATER" "PERCENT."
 TABULATE 10 "R3FW*100." COL-LABEL="R3WF" "WATER" "PERCENT."
 TABULATE 11 "R1COND" COL-LABEL="R1-COND"
 TABULATE 12 "R2COND" COL-LABEL="R2 -COND"
 VARY BLOCK-VAR BLOCK=CSTR1 VARIABLE=TEMP SENTENCE=PARAM
 RANGE LOWER="230" UPPER="270" INCR="10"
REPORT INPUT
BLOCK-REPORT EXCL-BLOCKS=DISTIL R1FLASH R2FLASH
STREAM-REPOR NOZEROFLOW MOLEFLOW MASSFLOW MASSFRAC STRUCTURE
```

Simulation Results

The resulting polymerization model reports the polymer component attributes. The information is reported over the reactor length for the PLUG flow reactor 49 in addition to other output reported. Ring opening and polyaddition reactions are incorporated in the step growth model using the user kinetics (Table III part A). Some typical results for the caprolactam polymerization are shown in FIGS. 6–10 and discussed next.

Figure 6:
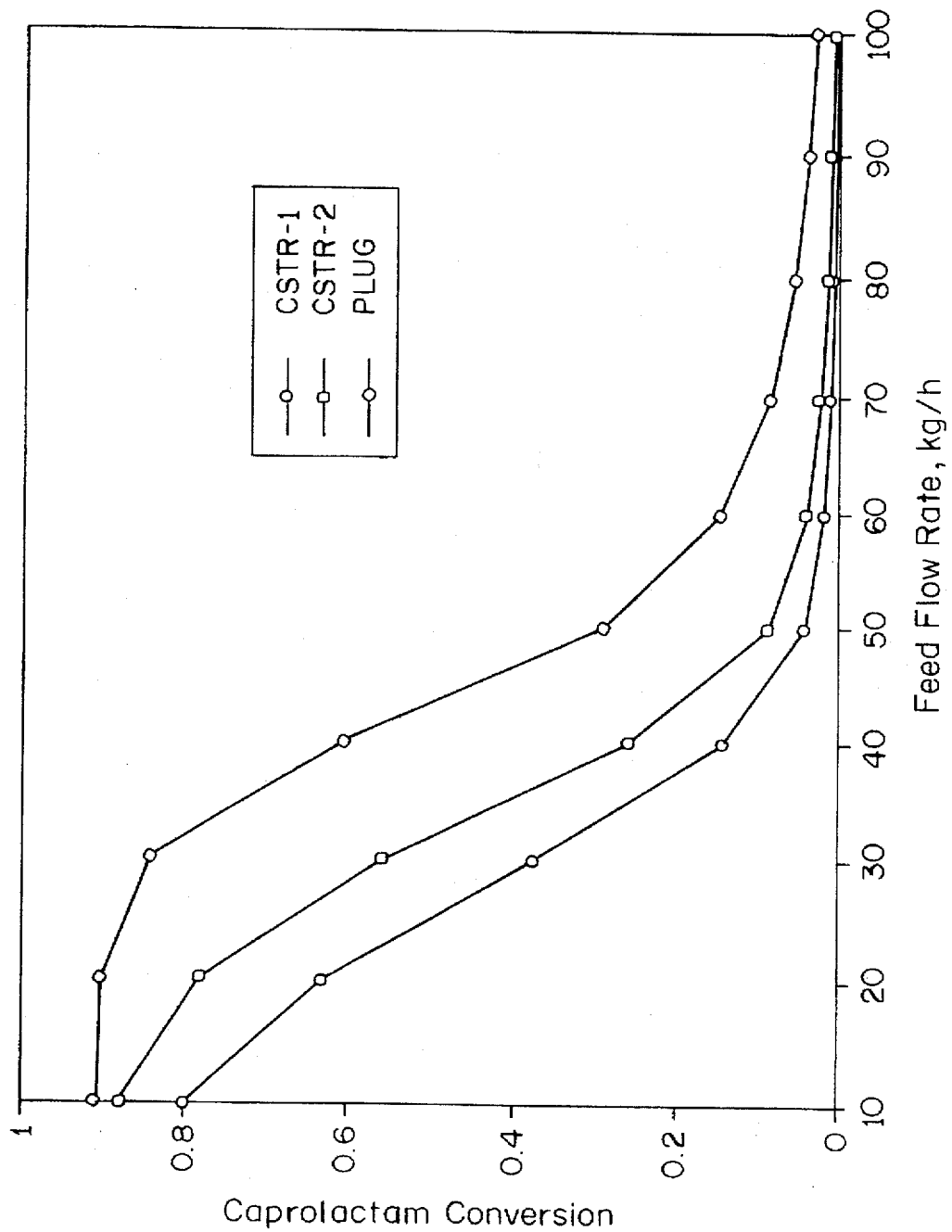
FIG. 6 is a graph of the feed flow rate versus caprolactam conversion of the example of FIGS. 4 and 5.
Figure 7:
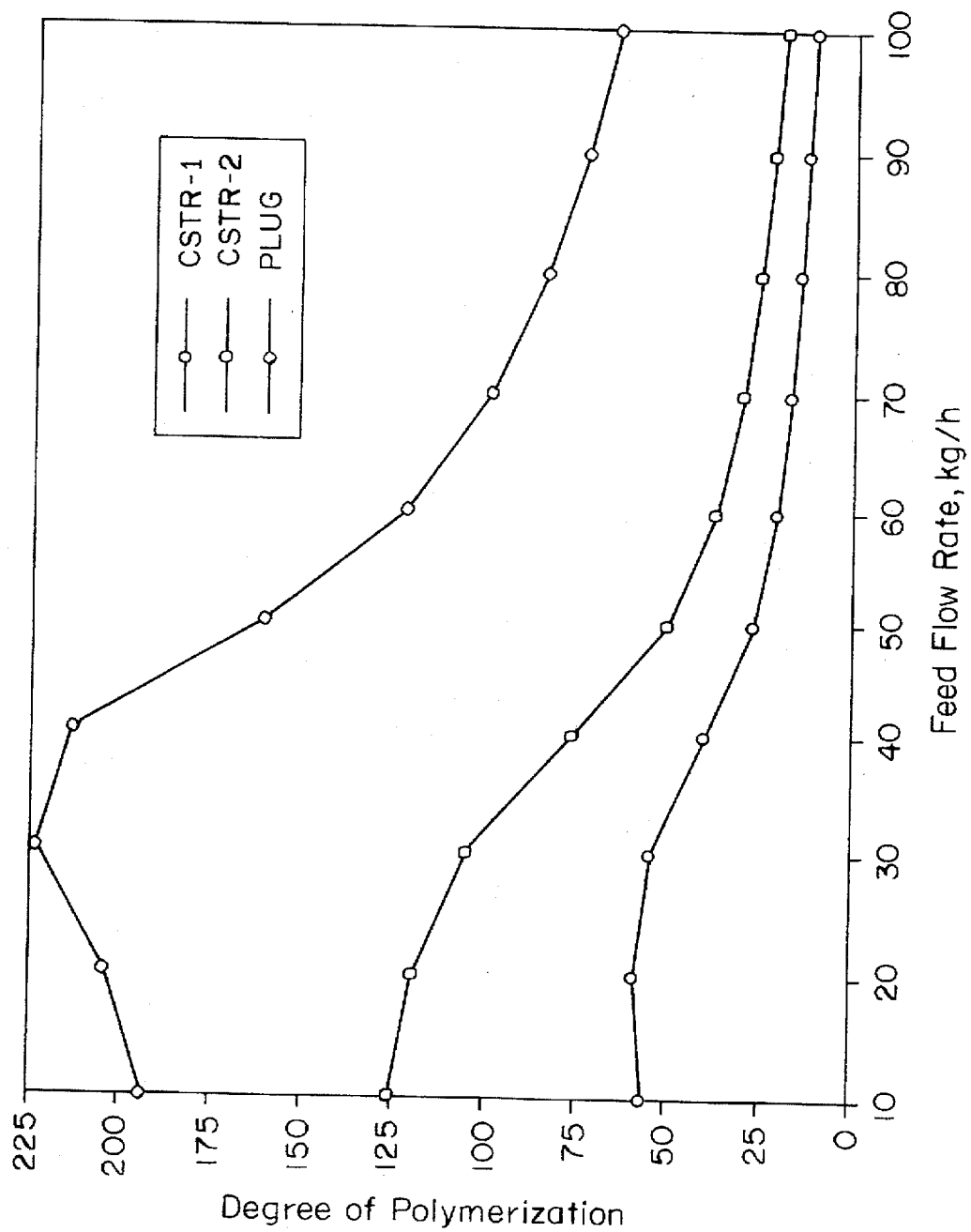
FIG. 7 is a graph of the feed flow rate versus degree of polymerization of the example of FIGS. 4 and 5.
Figure 8:
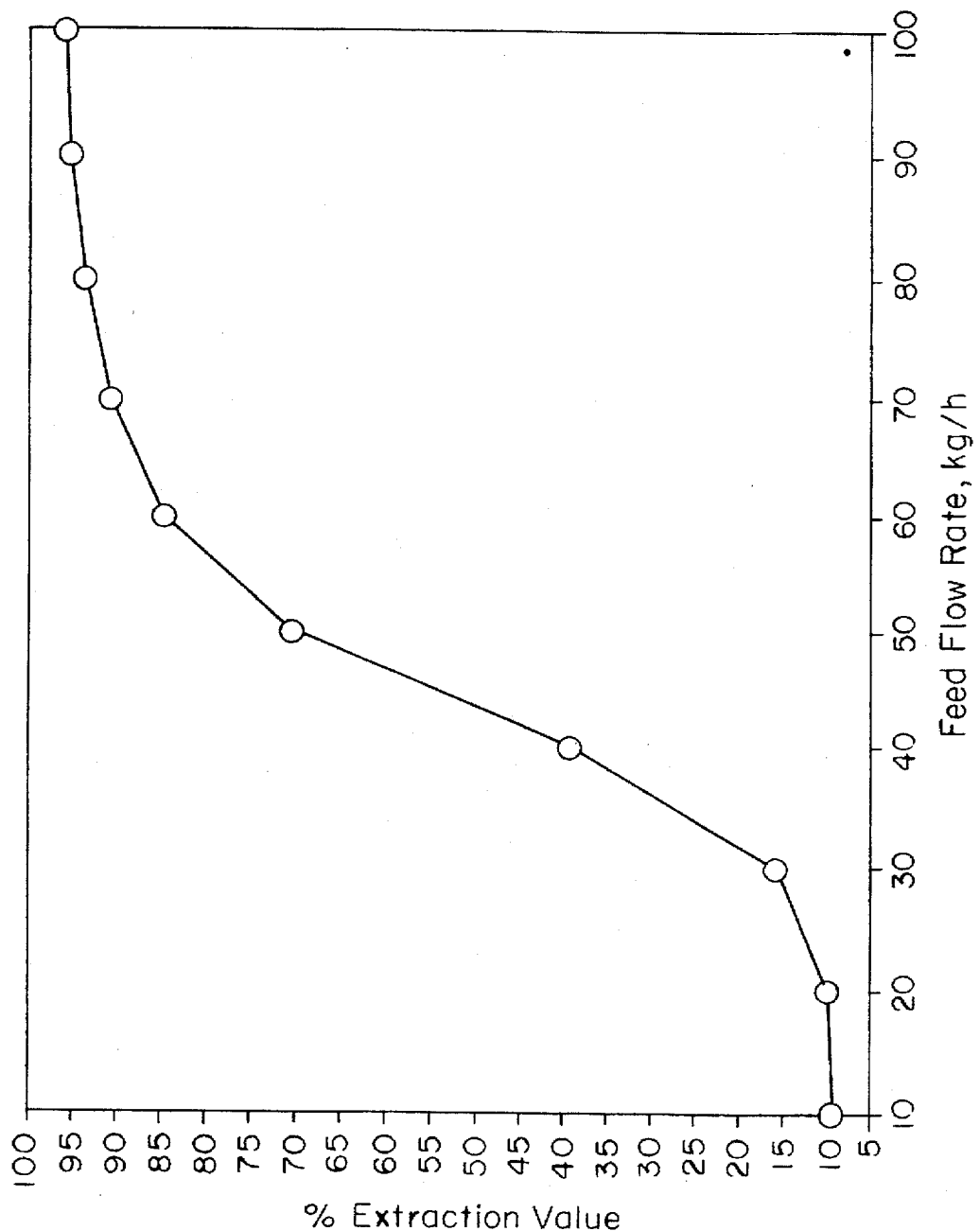
FIG. 8 is a graph of the feed flow rate versus extraction value in the example of FIGS. 4 and 5.
Figure 9:
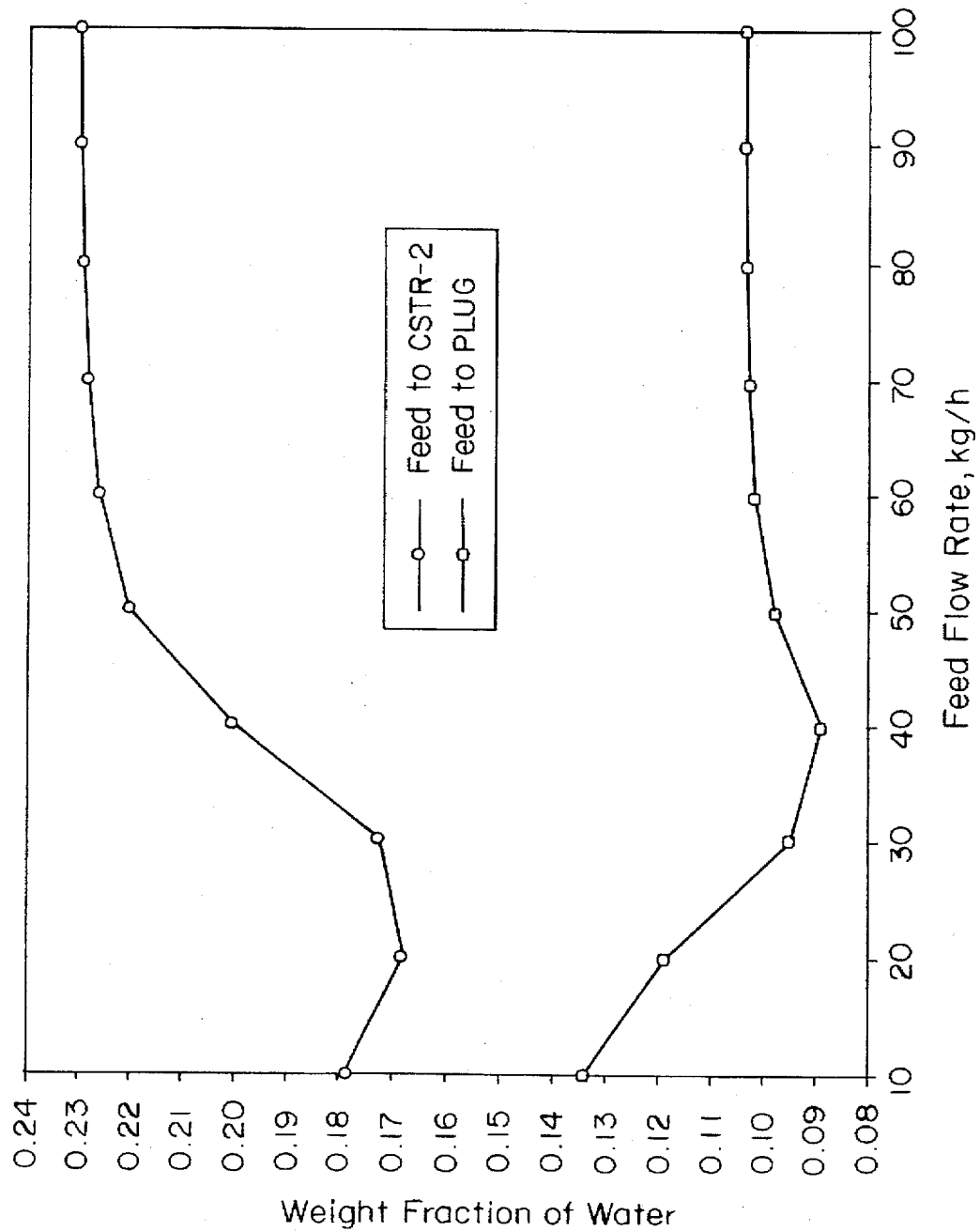
FIG. 9 is a graph of the feed flow rate versus amount of working water in the example of FIGS. 4 and 5.

The effect of feed flow rate on conversion, degree of polymerization and extraction value is examined in FIGS. 6, 7 and 8 respectively. Increasing the feed flow rate decreases the total residence time which, in turn, decreases the caprolactam conversion. Extraction value (EV) is the sum of the extractables from the polymer. These include unreacted caprolactam, aminocaproic acid and water. Since conversion decreases with an increase in the feed flow rate, EV increases. One should minimize the EV value to reduce the cost of recycling the unreacted monomers.

Notice a slight jump in DP, the degree of polymerization (FIG. 7), at a feed flow rate of 30 kg/h in the plug flow reactor. This is because of a decrease in the water concentration in the feed to the plug flow reactor 49 (see FIG. 9). DP of the polymer in plug flow reactor 49 is determined by the water concentration in the feed. It is important to control the water content in the feed to the plug flow reactor 49 in order to control the final polymer molecular weight.

Figure 10:
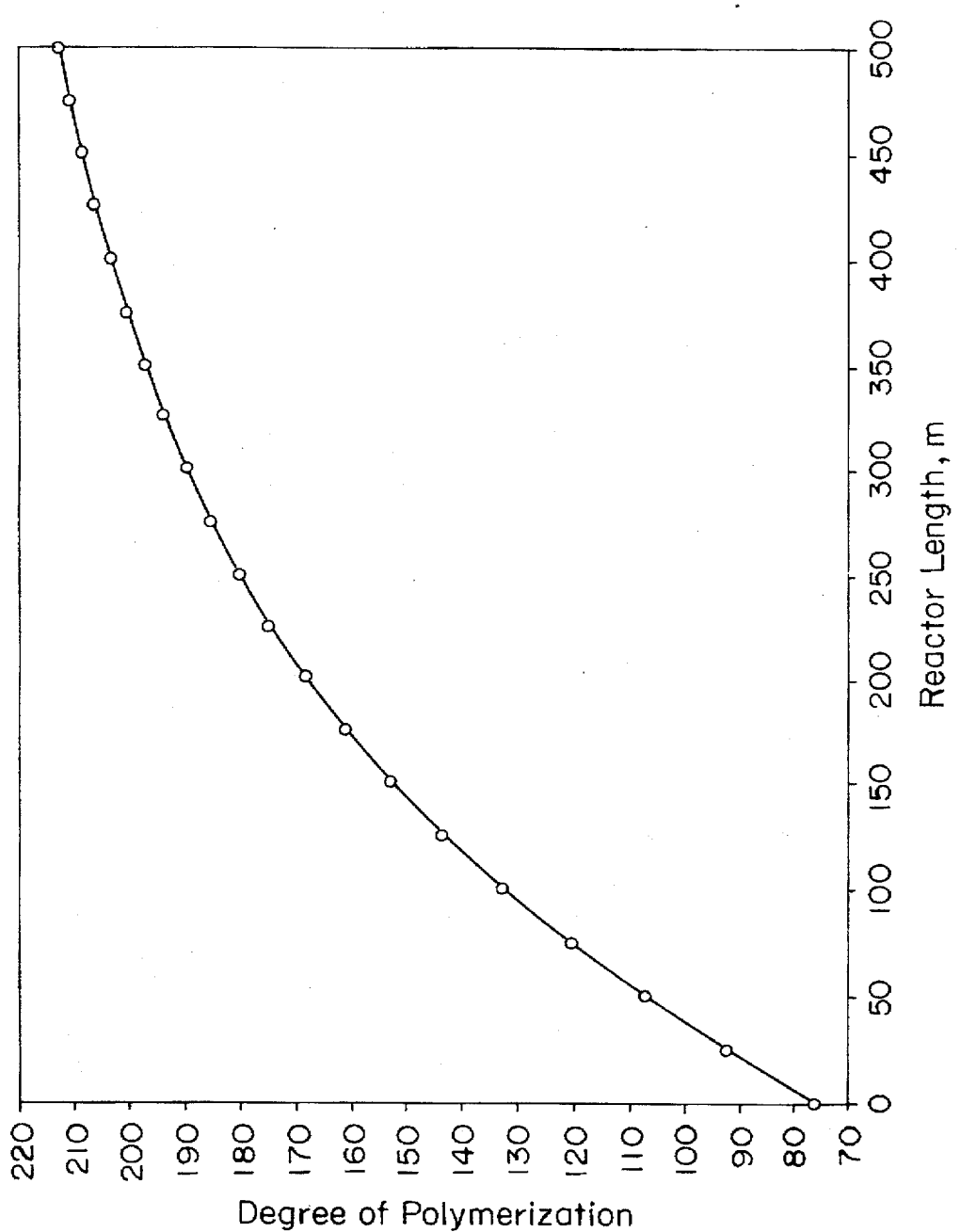
FIG. 10 is a graph of the degree of polymerization versus reactor length in the example of FIGS. 4 and 5.

FIG. 10 shows the degree of polymerization profile as a function of reactor length.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, the calculations 17, 19, 21 of FIG. 2 for steady state operation of a desired process may be performed in series from one unit to the next in the subject process design or in parallel until convergence. Likewise, the calculations may be performed in a combination of series and parallel treatment of the working units of the subject process design. Such variations in the performance of these calculations is in the purview of one skilled in the art.

Further, these calculations may be made to achieve the solutions for the dynamic modeling of the subject polymer process. In that case, the differential equations of the calculations at 17 are solved along with the calculations at 19 and 21 of FIG. 2.

In another example, the simulation software of the present invention is understood to be stored and executed in working memory 51 of a digital processor (such as the hard drive of a stand-alone PC, or the fileserver memory of a network of computers, or the like). However such software may alternatively be implemented as hardware, firmware or any combination of the same, as is in the view of one skilled in the art.

What is claimed is:

1. Digital processor apparatus for simulating polymer processes comprising:

input means for enabling user definition of a desired polymer process formed of a multiplicity of streams and elements, including at least one polymer component;

a data assembly coupled to the input means for holding data of the desired polymer process, for each polymer component the data assembly representing the polymer component as a collection of segments and a set of attributes, the collection of segments and set of attributes defining the polymer component, the data assembly utilizing an attribute set table which provides (i) polymer characteristics in a standardized manner from one polymer component to another, and (ii) distribution function moment information for describing polymer properties, such that said table specifies one or multiple polymer components to support simulation of a variety of polymer processes; and processor means for simulating the desired polymer process by mathematically modelling stream flow and element operations of the desired polymer process, the mathematical modelling including calculating polymer physical properties and attribute values of the polymer components, based on said moments of distribution functions, said calculating using the data stored in the data assembly according to the attribute set table.

2. Apparatus as claimed in claim 1 wherein for each polymer component, the data assembly includes attributes for indicating at least one of chain length, molecular weight average, polymer segment composition, end-group composition, type and degree of branching, and polymer molecular weight distribution moments.

3. Apparatus as claimed in claim 1 wherein for each polymer component the data assembly includes user defined attributes for further defining the polymer component.

4. Apparatus as claimed in claim 1 wherein there are different types of segments for defining a polymer component, and for each polymer component, the data assembly provides an indication of the different type segments defining the polymer component.

5. Apparatus as claimed in claim 1 wherein the processing means further stores different stages of calculation results in the data assembly, such that during mathematical modelling of each stream, the processor means uses stored values of the collection of segments and set of attributes of each polymer component as held in the data assembly.

6. Apparatus as claimed in claim 5 wherein the processor means further utilizes mixing and splitting rules to mathematically model at least one of mixing and splitting of streams.

7. Apparatus as claimed in claim 1 wherein the desired polymer process is formed of a multiplicity of polymer components; and the processor means mathematically models each polymer component.

8. In a digital processor, a method for simulating polymer processes comprising the steps of:

providing input means coupled to the digital processor for enabling user definition of a desired polymer process formed of a multiplicity of streams and elements, including at least one polymer component;

providing an attribute set table which provides (i) polymer characteristics in a standardized manner from one polymer component to another, and (ii) moment information of distribution functions which describe polymer properties, such that said table specifies one or multiple polymer components to support simulation of a variety of polymer processes;

according to the attribute set table placing and holding data of the desired polymer process in a data assembly coupled to the input means for each polymer component, the data assembly representing the polymer component as a collection of segments and a set of attributes, the collection of segments and set of attributes defining the polymer components; and using processor means, mathematically modelling stream flow and element operations of the desired polymer process to simulate the desired polymer process, the mathematical modelling including calculating polymer physical properties and attribute values of the polymer components, based on said distribution functions, said calculating using the data held in the data assembly.

9. A method as claimed in claim 8 wherein for each polymer component, the step of holding data in the data assembly includes representing in the data assembly attributes for indicating at least one of chain length, molecular weight average, polymer segment composition, end-group composition, type and degree of branching, and polymer molecular weight distribution moments.

10. A method as claimed in claim 8 wherein the step of holding data in the data assembly includes for each polymer component, enabling user definition of attributes in the data assembly for further defining the polymer component.

11. A method as claimed in claim 8 wherein there are different types of segments for defining a polymer component, and for each polymer component, the step of holding data in the data assembly includes providing in the data assembly an indication of the different type segments defining the polymer component.

12. A method as claimed in claim 8 further comprising the step of storing different stages of calculation results in the data assembly, such that during mathematical modelling of each stream, the processor means uses stored values of the collection of segments and set of attributes for each polymer component as held in the data assembly.

13. A method as claimed in claim 12 wherein the step of mathematically modelling includes utilizing mixing and splitting rules in the processor means to mathematically model at least one of mixing and splitting of streams.

\* \* \* \* \*